United States Patent
Fernández Gutiérrez

(10) Patent No.: US 8,565,140 B2
(45) Date of Patent: Oct. 22, 2013

(54) METHODS AND APPARATUS FOR MANAGING MULTICAST TRAFFIC THROUGH A SWITCH

(75) Inventor: Alvaro Fernández Gutiérrez, Barcelona (ES)

(73) Assignee: Media Patents, S.L. (ES)

( * ) Notice: Subject to any disclaimer, the term of this patent is extended or adjusted under 35 U.S.C. 154(b) by 260 days.

(21) Appl. No.: 12/846,693

(22) Filed: Jul. 29, 2010

(65) Prior Publication Data

US 2011/0058548 A1    Mar. 10, 2011

Related U.S. Application Data

(63) Continuation of application No. PCT/EP2008/003013, filed on Apr. 16, 2008.

(30) Foreign Application Priority Data

Feb. 1, 2008    (ES) .................................. 200800264

(51) Int. Cl.
*H04H 20/71* (2008.01)
*H04L 12/56* (2011.01)
*H04J 3/24* (2006.01)

(52) U.S. Cl.
USPC ............ 370/312; 370/390; 370/432; 370/475

(58) Field of Classification Search
USPC ......... 370/229–238, 254–256, 312–313, 332, 370/349, 389–390, 393, 400–401, 408, 412, 370/432, 471, 474–475; 709/223, 226–229, 709/238, 241–245, 249–252
See application file for complete search history.

(56) References Cited

U.S. PATENT DOCUMENTS

| | | | |
|---|---|---|---|
| 4,024,505 | A | 5/1977 | Sperling |
| 4,149,238 | A | 4/1979 | James et al. |

(Continued)

FOREIGN PATENT DOCUMENTS

| | | | |
|---|---|---|---|
| EP | 1185125 A1 | 3/2002 | |
| EP | 1318628 A1 | 11/2003 | |

(Continued)

OTHER PUBLICATIONS

Cain et al., "Internet Group Management Protocol, Version 3," Internet Engineering Task Force, Network Working Group; Request for Comments: 3376; Oct. 2002.

(Continued)

*Primary Examiner* — Tri H Phan
(74) *Attorney, Agent, or Firm* — Cantor Colburn LLP

(57) ABSTRACT

A method for managing multicast traffic through a switch operating in the layer 2 of the OSI model, and routers and switches involved in the method. In one implementation a router sends to a switch a message containing identification of specific equipment which has requested specific multicast traffic, and also containing a specification of the specific traffic, and when the switch receives data carrying multicast traffic, based on the destination and origin addresses of the data, and based on the identification of the specific equipment and of the specification of the specific multicast traffic that it has received in the message, the switch deduces if the data carry the specific traffic that has been requested by the specific equipment, and decides through which of its ports it transmits the data.

15 Claims, 4 Drawing Sheets

(56) References Cited

U.S. PATENT DOCUMENTS

| | | | |
|---|---|---|---|
| 5,835,370 A | 11/1998 | Nakamura | |
| 6,331,983 B1 | 12/2001 | Haggerty et al. | |
| 6,370,142 B1 | 4/2002 | Pitcher et al. | |
| 6,393,507 B2 | 5/2002 | Klein | |
| 6,434,622 B1 | 8/2002 | Monteiro et al. | |
| 6,457,059 B1 | 9/2002 | Kobayashi | |
| 6,553,028 B1* | 4/2003 | Tang et al. | 370/389 |
| 6,721,318 B1 | 4/2004 | Cai et al. | |
| 6,741,595 B2 | 5/2004 | Maher, III et al. | |
| 6,785,294 B1 | 8/2004 | Ammitzboll et al. | |
| 6,914,907 B1 | 7/2005 | Bhardwaj et al. | |
| 6,977,891 B1 | 12/2005 | Ranjan et al. | |
| 7,068,598 B1 | 6/2006 | Bryson | |
| 7,236,465 B2 | 6/2007 | Banerjee et al. | |
| 7,272,652 B1 | 9/2007 | Keller-Tuberg | |
| 7,283,521 B1 | 10/2007 | Ryan | |
| 7,301,945 B1* | 11/2007 | Ooms et al. | 370/390 |
| 7,346,053 B1 | 3/2008 | Leung et al. | |
| 7,355,970 B2 | 4/2008 | Lor | |
| 7,385,977 B2 | 6/2008 | Wu et al. | |
| 7,412,726 B1 | 8/2008 | Viswanath | |
| 7,450,551 B2 | 11/2008 | Lim et al. | |
| 7,477,654 B2 | 1/2009 | Murray et al. | |
| 7,502,474 B2 | 3/2009 | Kaniz et al. | |
| 7,512,146 B1 | 3/2009 | Sivasankaram et al. | |
| 7,599,289 B2 | 10/2009 | Caci | |
| 7,599,393 B1 | 10/2009 | Ho | |
| 7,640,333 B1 | 12/2009 | Fernandez Gutierrez | |
| 7,680,884 B2* | 3/2010 | Zhou et al. | 709/205 |
| 7,840,651 B2* | 11/2010 | Cinghita et al. | 709/219 |
| 7,908,354 B2 | 3/2011 | Fernandez Gutierrez | |
| 7,921,198 B2 | 4/2011 | Fernandez Gutierrez | |
| 8,064,449 B2* | 11/2011 | Fernandez Gutierrez | 370/390 |
| 8,189,584 B2* | 5/2012 | Fernandez Gutierrez | 370/390 |
| 2002/0099857 A1 | 7/2002 | Lowe et al. | |
| 2002/0120769 A1* | 8/2002 | Ammitzboell | 709/238 |
| 2003/0067917 A1 | 4/2003 | Morrison et al. | |
| 2003/0079040 A1* | 4/2003 | Jain et al. | 709/238 |
| 2003/0123453 A1 | 7/2003 | Ooghe et al. | |
| 2004/0022244 A1 | 2/2004 | Boers et al. | |
| 2004/0117503 A1 | 6/2004 | Nguyen et al. | |
| 2004/0122890 A1 | 6/2004 | Watkinson | |
| 2004/0158872 A1 | 8/2004 | Kobayashi | |
| 2004/0165709 A1 | 8/2004 | Pence et al. | |
| 2004/0190542 A1 | 9/2004 | Ono et al. | |
| 2004/0202295 A1 | 10/2004 | Shen et al. | |
| 2004/0219911 A1 | 11/2004 | Kouchri et al. | |
| 2004/0252690 A1 | 12/2004 | Pung et al. | |
| 2004/0255126 A1 | 12/2004 | Reith | |
| 2005/0041680 A1 | 2/2005 | Tanaka et al. | |
| 2005/0063544 A1 | 3/2005 | Uusitalo et al. | |
| 2005/0111474 A1* | 5/2005 | Kobayashi | 370/432 |
| 2005/0157741 A1* | 7/2005 | Wu et al. | 370/432 |
| 2005/0174937 A1 | 8/2005 | Scoggins et al. | |
| 2005/0175156 A1 | 8/2005 | Afshar et al. | |
| 2005/0180448 A1* | 8/2005 | Kobayashi | 370/432 |
| 2005/0190765 A1 | 9/2005 | Gotoh et al. | |
| 2005/0207354 A1 | 9/2005 | Nekovee et al. | |
| 2005/0265374 A1 | 12/2005 | Pelt | |
| 2006/0018255 A1 | 1/2006 | Tankhiwale | |
| 2006/0036733 A1 | 2/2006 | Fujimoto et al. | |
| 2006/0050643 A1 | 3/2006 | Yoshimoto | |
| 2006/0059163 A1 | 3/2006 | Fraura et al. | |
| 2006/0088031 A1 | 4/2006 | Nalawade | |
| 2006/0095766 A1 | 5/2006 | Zhu et al. | |
| 2006/0104308 A1 | 5/2006 | Pinkerton et al. | |
| 2006/0114908 A1 | 6/2006 | Kalkunte et al. | |
| 2006/0120368 A1 | 6/2006 | Aboukarr et al. | |
| 2006/0146792 A1 | 7/2006 | Ramachandran et al. | |
| 2006/0146857 A1 | 7/2006 | Naik et al. | |
| 2006/0159092 A1 | 7/2006 | Boers et al. | |
| 2006/0182109 A1 | 8/2006 | Melsen et al. | |
| 2006/0209829 A1 | 9/2006 | Lo et al. | |
| 2006/0221861 A1 | 10/2006 | Previdi et al. | |
| 2006/0221958 A1 | 10/2006 | Wijnands et al. | |
| 2006/0239289 A1 | 10/2006 | Zheng et al. | |
| 2006/0262792 A1 | 11/2006 | Rokui | |
| 2006/0274720 A1 | 12/2006 | Adams et al. | |
| 2007/0011350 A1 | 1/2007 | Lu et al. | |
| 2007/0041558 A1 | 2/2007 | Parayi et al. | |
| 2007/0047545 A1 | 3/2007 | Bou-Diab et al. | |
| 2007/0064695 A1 | 3/2007 | Song et al. | |
| 2007/0086457 A1 | 4/2007 | Rune et al. | |
| 2007/0124454 A1 | 5/2007 | Watkinson | |
| 2007/0143858 A1 | 6/2007 | Hearty | |
| 2007/0168555 A1 | 7/2007 | Dorenbosch | |
| 2007/0177594 A1 | 8/2007 | Kompella | |
| 2007/0183403 A1 | 8/2007 | Somers | |
| 2007/0211626 A1 | 9/2007 | Gooch et al. | |
| 2007/0211722 A1 | 9/2007 | Subramanian | |
| 2007/0255824 A1 | 11/2007 | Granzer | |
| 2007/0297376 A1 | 12/2007 | Gass | |
| 2007/0297418 A1 | 12/2007 | Lee | |
| 2008/0056243 A1 | 3/2008 | Roy et al. | |
| 2008/0056256 A1 | 3/2008 | Cinghita et al. | |
| 2008/0095146 A1 | 4/2008 | Granzer | |
| 2008/0095183 A1 | 4/2008 | Bijwaard et al. | |
| 2008/0101363 A1* | 5/2008 | Li | 370/390 |
| 2008/0123644 A1 | 5/2008 | Storry et al. | |
| 2008/0219237 A1 | 9/2008 | Thubert et al. | |
| 2008/0232368 A1* | 9/2008 | Ikegami et al. | 370/390 |
| 2009/0059911 A1 | 3/2009 | Fine | |
| 2009/0100147 A1 | 4/2009 | Igarashi | |
| 2009/0100194 A1 | 4/2009 | Bhadri et al. | |
| 2009/0172151 A1 | 7/2009 | Davis | |
| 2009/0190518 A1 | 7/2009 | Kim et al. | |
| 2009/0310609 A1 | 12/2009 | Fernandez Gutierrez | |
| 2010/0005499 A1 | 1/2010 | Covey | |
| 2010/0014519 A1 | 1/2010 | Fernandez Gutierrez | |
| 2010/0040056 A1 | 2/2010 | Kobayashi | |
| 2010/0046516 A1 | 2/2010 | Fernandez Gutierrez | |
| 2010/0054247 A1 | 3/2010 | Fernandez Gutierrez | |
| 2010/0054248 A1 | 3/2010 | Fernandez Gutierrez | |
| 2010/0054249 A1 | 3/2010 | Fernandez Gutierrez | |
| 2010/0172351 A1 | 7/2010 | Fernandez Gutierrez | |
| 2010/0172352 A1 | 7/2010 | Fernandez Gutierrez | |
| 2010/0172353 A1 | 7/2010 | Fernandez Gutierrez | |
| 2010/0183008 A1 | 7/2010 | Fernandez Gutierrez | |
| 2010/0220726 A1* | 9/2010 | Lo et al. | 370/392 |
| 2010/0254383 A1 | 10/2010 | Fernandez Gutierrez | |
| 2011/0010441 A1 | 1/2011 | Fernando Gutierrez | |
| 2011/0019673 A1 | 1/2011 | Fernandez Gutierrez | |
| 2011/0058551 A1 | 3/2011 | Fernandez Gutierrez | |
| 2011/0305239 A1* | 12/2011 | Chandrashekharachar Suvarneshwar | 370/390 |
| 2012/0201246 A1* | 8/2012 | Fernandez Gutierrez | 370/390 |

FOREIGN PATENT DOCUMENTS

| | | |
|---|---|---|
| EP | 1389862 A1 | 2/2004 |
| EP | 1429489 A2 | 6/2004 |
| EP | 1432172 A2 | 6/2004 |
| EP | 1734688 A1 | 12/2006 |
| EP | 2078376 B2 | 12/2010 |
| WO | WO0203614 A2 | 1/2002 |
| WO | WO2006001803 A1 | 1/2006 |
| WO | WO2009/000306 A1 | 12/2008 |
| WO | WO2009049659 A1 | 4/2009 |
| WO | WO2009056175 A1 | 5/2009 |
| WO | WO2009095041 A1 | 8/2009 |
| WO | WO2009109684 A1 | 9/2009 |
| WO | WO2010072611 A1 | 4/2010 |
| WO | WO2010097288 A1 | 9/2010 |
| WO | WO2011012582 A2 | 2/2011 |

OTHER PUBLICATIONS

PCT Application No. PCT/EP2010/060815; Patent Cooperation Treaty International Search Report and Written Opinion issued by the European Patent Office dated Feb. 8, 2011.

Fan, et al. "WRHMCC: New Congestion Control Mechanism Multicast Applications" Global Telecommunications Conference 2003 GLOBECOM '03. IEEE; vol. 5 2003; pp. 2845-2949.

(56) References Cited

OTHER PUBLICATIONS

Pompili, et al. "Multicast Algorithms Service Overlay Networks" Computer Communications; Feb. 2008, vol. 31 Issue 3, pp. 489-505.
Lawson, "IP Multicast Finds a Role Inside Firewall" InfoWorld 18.n41 (Oct. 7, 1996) p. 51.
Zhang, et al "Universal IP Multicast Delivery" Computer Science Dept. University of Arizona, Tucson, AZ.
Deering, et al. "An Architecture for Wide-Area Multicast Routing" SIGCOMM '94: Proceedings of the Conference on Communications Architectures.
Deering, et al. "The PIM Architecture for Wide-Area Multicast Routing" IEEE/ACM Transactions on Networking (TON), vol. 4 Issue 2.
Ritvanen "Multicast Routing and Addressing" Seminar on Internetworking, 2004.
Paul, et al. "Survey of Multicast Routing Algorithms and Protocols" Proceedings of the 15th International Conference on Computer Communication, 2002.
Elderini, et al., "Supporting a Multicast Communication for Large Scale Groups" 2002, IEEE MELECON, pp. 7-11.
"Lawful Interception (LI): Handover Interface Service-Specific Details (SSD) for IP Delivery, Part 5L Service-Specific Details for IP Multimedia Services" ETSI TS 102 232-5 ETSI Standards, LIS Sophia Anapolis Cedez, France, vol. LI, No. V2.3.1, Apr. 2008, pp. 6,7,10, and 15.
Handley, et al. "Spd: Session Description Protocol" RCF4566, IETF Standard, Internet Engineering Task Force, IETF, CH, Jul. 1, 2006, p. 11.
Transmittal of International Search Report and Written Opinion of International Searching Authority PCT/EP2009/061577 dated Feb. 8, 2010.
"Communications Assistance for Law Enforcement Act of 1994" At the Second Session, One Hundred Third Congress of the United States of America, Pub. L No. 103-414, 108 Stat. 4279; Amendment to Title 18, United States Code.
European Search Report for European Patent Application No. 10189098.6 issued by the European Patent Office dated Dec. 10, 2010.
International Preliminary Report on Patentability dated Oct. 14, 2010 for PCT/ES2009/070047.
E. Al-Shaer et al., "Toward Integrating IP Multicasting in Internet Network Management Protocols", Computer Communications, vol. 24, No. 5, Mar. 15, 2001, pp. 473-485, Publisher: Elsevier.
R. Vida et al., Engineering Task Force, Network Working Group, Request for Comments 3810, Jun. 2004; currently available at Internet address http://tools.ietf.org/html/rfc3810.
B. Fenner et al., Engineering Task Force, Network Working Group, Request for Comments 4605, Aug. 2006; currently available at Internet address http://tools.ietf.org/html/rfc4605.
B. Fenner et al., Engineering Task Force, Network Working Group, Request for Comments 4601, Aug. 2006; currently available at Internet address http://tools.ietf.org/html/rfc4601.
K. McCloghrie et al., Internet Engineering Task Force, Request for Comments 2578, "The structure of Management Information Version 2, SMIv2", Apr. 1999; currently available on the Internet at http://www3.tools.ietf.org/html/rfc2578.
K. McCloghrie et al., Internet Engineering Task Force, Request for Comments 2579, "Textual Conventions for SMIv2", Apr. 1999; currently available on the Internet at http://www3.tools.ietf.org/html/rfc2579.
D. Harrington et al., Internet Engineering Task Force, Request for Comments 3411, "An Architecture for Describing Simple Network Management Protocol (SNMP) Management Frameworks", Dec. 2002, currently available on the Internet at http://www3.tools.ietf.org/html/rfc3411.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Record Type  |  Aux Data Len |       Number of Sources (N)   |
+-+-+-+-+-+-+-+-+-+-+-+-+-+-+-+-+-+-+-+-+-+-+-+-+-+-+-+-+-+-+-+-+
|                       Layer 3 Identifier                      |
+-+-+-+-+-+-+-+-+-+-+-+-+-+-+-+-+-+-+-+-+-+-+-+-+-+-+-+-+-+-+-+-+
|                       Layer 2 Identifier                      |
+-+-+-+-+-+-+-+-+-+-+-+-+-+-+-+-+-+-+-+-+-+-+-+-+-+-+-+-+-+-+-+-+
|  Layer 2 Identifier (cont.)   |          Reserved             |
+-+-+-+-+-+-+-+-+-+-+-+-+-+-+-+-+-+-+-+-+-+-+-+-+-+-+-+-+-+-+-+-+
|                        Multicast Address                      |
+-+-+-+-+-+-+-+-+-+-+-+-+-+-+-+-+-+-+-+-+-+-+-+-+-+-+-+-+-+-+-+-+
|                        Source Address [1]                     |
+-+-+-+-+-+-+-+-+-+-+-+-+-+-+-+-+-+-+-+-+-+-+-+-+-+-+-+-+-+-+-+-+
|                        Source Address [2]                     |
+-+-+-+-+-+-+-+-+-+-+-+-+-+-+-+-+-+-+-+-+-+-+-+-+-+-+-+-+-+-+-+-+
.                               .                               .
.                               .                               .
+-+-+-+-+-+-+-+-+-+-+-+-+-+-+-+-+-+-+-+-+-+-+-+-+-+-+-+-+-+-+-+-+
|                        Source Address [N]                     |
+-+-+-+-+-+-+-+-+-+-+-+-+-+-+-+-+-+-+-+-+-+-+-+-+-+-+-+-+-+-+-+-+
```

FIG. 3

METHODS AND APPARATUS FOR MANAGING MULTICAST TRAFFIC THROUGH A SWITCH

CROSS-REFERENCE TO RELATED APPLICATIONS

This application is a continuation of, relates to and claims the benefit of International Application No. PCT/EP2008/003013 filed Apr. 16, 2008, which relates to and claims the benefit of and priority from Spanish Patent Application No. P200800264 filed Feb. 1, 2008.

FIELD OF THE INVENTION

The invention is comprised in the field of multicast technology in data networks.

More specifically, the invention relates to a method for managing multicast traffic through a switch.

The invention also relates to a router and a switch involved in the method.

BACKGROUND

Multicast technology makes it possible to send data from a single source to many recipients through a data network, without having to set up unicast communication, i.e. one-to-one individual communication between the source and each of the recipients. To that end the source sends data, in data packet form, to a single address associated to a multicast group to which the equipment interested in being recipients of the data sending can subscribe. This address, referred to as a multicast address or also as a multicast group address, is an IP (Internet Protocol) address chosen within a range that is reserved for multicast applications. The data packets which have been sent by the source to the multicast address are then replicated in the different network routers so that they can reach the recipients that have joined the multicast group.

The recipients which receive data in a multicast group are usually equipment connected to the data network by means of a proxy or a router. Hereinafter, the common term host will be used to refer to the recipient equipment. A host can be, for example, a computer or a set-top box (digital signal decoder) connected to a television set.

When a host wants to receive the information sent by one or several sources of a multicast group, it sends to the closest router, or to an intermediate proxy, a subscription message to subscribe to the group so that the router transmits to it the data arriving through the data network and which has been sent by the sources of the multicast group. Likewise, when a host wishes to stop receiving data sending in the multicast group, it sends to the router or to the proxy an unsubscribe message to stop receiving them.

The messages exchanged between a host and the closest router to manage membership to a multicast group use the IGMP protocol (Internet Group Management Protocol) or the MLD (Multicast Listener Discovery) protocol, according to whether or not the router works with version 4 (IPv4) or version 6 (IPv6) of the IP protocol (Internet Protocol), respectively.

When there is a proxy between the host and the router, the proxy also uses the IGMP/MLD protocols to exchange with the host, the closest router or other intermediate proxy, the multicast group membership messages. In these cases, the proxy can receive from different hosts requests to subscribe to or to unsubscribe from a multicast group, and it assembles them to thus reduce IGMP/MLD message traffic it sends to the router.

In addition, routers exchange messages with one another for the purpose of defining the routing which allows efficiently routing the data from the sources to the hosts that have subscribed to a multicast group. To that end, the routers use specific protocols, including the very well known PIM-SM (Protocol Independent Multicast—Sparse Mode).

In summary, the routers receive from the hosts, in the form of IGMP/MLD messages, information specifying which multicast groups they want to receive traffic from, and they communicate with other routers, for example by means of the PIM-SM protocol, for the purpose of setting up a routing which takes the traffic requested by the hosts to such hosts.

All the mentioned protocols are defined and documented by the Internet Engineering Task Force (IETF).

The IGMP protocol version currently being used is IGMPv3, which is described in the RFC 3376 specifications published on line by the IETF (B. Cain et al., Engineering Task Force, Network Working Group, Request for Comments 3376, October 2002; currently available at Internet address http://tools.ietf.org/html/rfc3376).

With regard to the MLD protocol, the version currently being used is MLDv2, which is described in the RFC 3810 specifications published on line by the IETF (R. Vida et al., Engineering Task Force, Network Working Group, Request for Comments 3810, June 2004; currently available at Internet address http://tools.ietf.org/html/rfc3810).

The operation of an IGMP proxy is described in the RFC 4605 specifications published on line by the IETF (B. Fenner et al., Engineering Task Force, Network Working Group, Request for Comments 4605, August 2006; currently available at Internet address http://tools.ietf.org/html/rfc4605).

The PIM-SM protocol used for the communication between routers is described in the RFC 4601 specifications published on line by the IETF (B. Fenner et al., Engineering Task Force, Network Working Group, Request for Comments 4601, August 2006; currently available at Internet address http://tools.ietf.org/html/rfc4601).

Multicast technology was initially implemented primarily to be applied to the many-to-many communication model, known as ASM (Any Source Multicast), in which many users communicate with one another and any of them can send data and also receive data from everyone else. A typical ASM application is multiparty calling via Internet.

Multicast technology was then implemented to be applied to the one-to-many communication model known as SSM (Source Specific Multicast), in which a single source sends data for many recipients. Radio and television via Internet are SSM applications. This is why SSM is currently very interesting.

In earlier IGMP protocol versions, a host could not choose the data sending sources it wanted to subscribe to within a multicast group, rather the host could only subscribe to or unsubscribe from the group for all the sources. The messages a host sent to a router were very simple: Join (G) to receive traffic from the multicast group G and Leave (G) to stop receiving it. Therefore, earlier IGMP protocol versions did not allow SSM.

The possibility that the hosts could choose the sources within a multicast group was introduced in the IGMPv3 version of the IGMP protocol to allow SSM. To that end, a host can send two types of IGMP messages:

An INCLUDE message, consisting of indicating the IP addresses of the sources from which it wishes to receive the data sending. According to the terminology of the RFC 3376 specifications, the IP addresses of the chosen sources are referred to as INCLUDE sources.

An EXCLUDE message, consisting of indicating the IP addresses of the sources from which it does not wish to receive the data sending. In this case, it is interpreted that the host wishes to receive data sent by all the sources except the sources indicated as excluded in the message. According to the terminology of the RFC 3376 specifications, the IP addresses of the excluded sources are referred to as EXCLUDE sources.

It was decided in the IGMPv3 that each network interface could operate only in one of the following two modes, being able to switch from one to the other: an INCLUDE mode in which the network interface defines an INCLUDE source list, or an EXCLUDE mode in which the network interface defines an EXCLUDE source list.

Hereinafter, and according to common SSM technology nomenclature, the sending of the source S within the multicast group G is referred to as channel (S,G).

In the current state of the art, in order to save memory or to simplify multicast routing protocols, the routers using the IGMP and PIM-SM protocols store only the minimum information of the multicast traffic that they should transmit for each network interface. This minimum information basically consists of storing, for each network interface of the router, information of the state of the multicast channels (S,G) or multicast groups (*,G) for which there is at least one equipment interested in receiving the traffic, along with a timer associated to each channel or multicast group indicating how much time has passed since the router received the last message requesting the multicast traffic.

The presence of switches in data networks, especially in Local Area Networks or LAN, is common. A layer 2 switch is an electronic network interconnection device normally operating in layer 2 (data link layer) of the OSI (Open Systems Interconnection) model. The OSI model is the open systems interconnection reference model created by the ISO (International Organization for Standardization) and is very well known by a person skilled in the art. A switch interconnects two or more network segments, passing data from one segment to another according to the OSI model layer 2 destination address (for example a MAC address in Ethernet networks) of the datagrams reaching the switch. To be able to send the datagrams to the equipment connected to each of its ports, a switch finds out and stores the layer 2 address of each equipment connected to each of its ports.

The operation of a switch according to the prior state of the art when it operates in an Ethernet network is described in further detail below.

The most widely used group of low-level protocols in LAN networks is currently the group of Ethernet protocols defined by the IEEE (Institute of Electrical and Electronics Engineers) specifications. Ethernet defines both the physical layer (layer 1) and the data link layer (layer 2) in the OSI model, and divides the data link layer into two sub-layers: a layer called LLC (Logical Link Control) which is defined in the IEEE 802.2 specifications and a MAC (Media Access Control) layer which is defined in different IEEE 802.3 specifications, such as for example IEEE 802.3u (Fast Ethernet) based on electric cables, or IEEE 802.3z based on fiber optics. There are also wireless Ethernet protocols, such as IEEE 802.11 also known as Wi-Fi, or IEEE 802.16 known as WiMAX.

The same LLC protocol can be used with different MAC layer protocols, resulting from the fact that the IEEE defines new MAC level protocols without modifying the LLC protocol. This is one of the reasons for the success of Ethernet.

One of the functions of the MAC layer is to define the physical addresses of the equipment. Ethernet uses 6-byte physical addresses referred to as MAC addresses (Media Access Control Address).

The IEEE defines three categories of MAC addresses:

Unicast MAC addresses: these are MAC addresses uniquely identifying each network card. The address is usually defined by the hardware of each network card.

Broadcast MAC address: this is the MAC address the 6 bytes of which have the value FFFF.FFFF.FFFF in hexadecimal format. If a data frame is addressed to this address, all the equipment in the network receives the data frame and must process it.

Multicast MAC addresses: these are addresses used to transport multicast data packets. When the IP protocol is used, a multicast MAC address has the form of 0100.5exx.xxxx in the hexadecimal system, where xx.xxxx can be a value between 00.0000 and 7f.ffff.

Since there are only 23 bits to define a multicast MAC address of a data frame and in contrast the IPv4 protocol uses 28 bits to define a multicast IP address in an IP data packet (the first 4 bits of a multicast IP data packet are always 1110 in binary system), the 28 bits of the multicast IP address of an IP data packet must be transferred to the 23 bits of the multicast MAC address of the corresponding data frame. Therefore, 5 bits of the multicast IP address are lost in this process. The manner of performing this transfer consists of transferring the 23 least significant bits of the multicast IP address to the 23 bits of multicast MAC address. Therefore, a single multicast MAC address corresponds to 32 multicast IP addresses. This is a problem that makes it difficult to manage multicast traffic in the switches of the state of the art.

Another problem in managing multicast traffic in the switches of the state of the art is that when an Ethernet switch connecting routers, or routers and hosts, receives an IP data packet with a multicast group IP address, the switch cannot associate the multicast group IP address with the unicast MAC addresses of the equipment connected to its ports, and therefore the switch does not know through which ports and to which equipment it should send the data packet.

When the switch receives an IP data packet with a multicast group address, since it cannot know through which ports and to which equipment it should send the packet, it sends it through all its ports and to all the equipment connected to the ports. This operation involves an unnecessary bandwidth consumption, given that the switch is sending data packets to equipment that does not need the packets. Furthermore, in some cases this equipment receiving unrequested packets must process them in order to decide what to do with them, which unnecessarily reduces the processing capacity of the equipment for other tasks.

To avoid this problem, a series of techniques to be used in Ethernet switches which transmit multicast traffic between routers or between routers and hosts have been developed.

A solution has been provided by the CGMP (Cisco Group Management Protocol) protocol of the company Cisco Systems Inc, which is described, for example, in Developing IP Multicast Networks—Vol. I, Beau Williamson, Cisco Press, 2000.

The CGMP protocol can only be used in switches which are in the section of the of network comprised between the hosts requesting multicast traffic by means of IGMP messages and the router receiving the IGMP messages. According to this protocol, when the IGMP router receives through a network interface an IGMP message sent by a host, it sends towards the switch, through the same network interface, a data frame containing information of the MAC addresses of the host that sent the IGMP message and the multicast MAC address corresponding with the multicast group of the IGMP message.

The CGMP protocol is virtually not used in the section of the network where IGMP messages circulate because it has several drawbacks. A first drawback is that the router sends to the switch the information of the multicast traffic using layer 2 multicast addresses which, as previously explained, each correspond to 32 layer 3 multicast addresses, and this can cause the switch to transmit 31 unrequested channels associated to a single requested channel. A second drawback is that the CGMP protocol only discriminates traffic at the multicast group level, without taking into account the sources of origin of the traffic within each multicast group. This may also cause the switch to transmit unwanted traffic. Another drawback is that since the CGMP protocol sends the information in layer 2 data frames, it is dependent on the layer 2 format for which it is designed and therefore it does not work with formats other than layer 2 formats or with new layer 2 technologies, such as for example the MPLS (Multi-Protocol Label Switching) technology for example. Another drawback of the CGMP protocol is that it does not use timers. This is a problem because when a host using the IGMPv2 protocol does not send a message to the router to indicate it to stop transmitting multicast traffic that it was receiving, the switch will continue to transmit the multicast traffic to the host to the long as the traffic continues to reach the switch, for example because there are other users connected to the switch receiving the traffic.

Another solution is provided in the RGMP (Router-port Group Management Protocol) protocol defined in the RFC3488 specifications edited online by the IETF (I. Wu et al., Engineering Task Force, Network Working Group, Request for Comments 3844, February 2003; currently available at Internet address http://tools.ietf.org/html/rfc3488). According to this RGMP protocol, each network interface of the router sends messages to the switch in which it informs the switch of which multicast traffic it wishes to receive through the network interface. This solution is also described in U.S. Pat. No. 6,847,638. This method has the limitation that it only solves the problem in ports of the switch where there is a router executing this protocol, but it does not solve the problem in ports of the switch where there are only hosts connected. Furthermore, it can only be applied to the port of the switch where a single router is connected and is incompatible with the most widely used technique today referred to as IGMP snooping, explained below, because the RGMP protocol is used to limit the traffic that the switch sends towards the router and the IGMP snooping specifications indicate that all multicast traffic must be sent in the ports of the switch where a router is detected.

Another rather infrequently used solution is defined in the IEEE 802.1 D-2004 specifications, which describe protocols referred to as GARP (Generic Attribute Registration Protocol) and GMRP (GARP Multicast Registration Protocol) mainly characterized by operating at the data link layer or layer 2 of the OSI model. This involves several drawbacks. A first drawback is that the most widely used multicast protocols, such as IGMP and PIM-SM, operate at the network layer or layer 3 of the OSI model and transmit the information in this layer 3, which is not the layer in which the GARP and GMRP protocols operate. A second drawback is that defining multicast traffic at layer 2, i.e. at the layer of physical addresses (MAC address) in the multicast range is worse than defining it at layer 3, since, as previously explained, each layer 2 multicast address corresponds to 32 layer 3 multicast addresses, whereby it may occur that unrequested multicast channels are transmitted.

A common feature of the mentioned solutions based on the CGMP, RGMP and GARP protocols is that they do not allow managing or discriminating SSM multicast traffic because they do not take into account the IP addresses of the data emitting sources.

Due to all these drawbacks, a technique referred to as IGMP snooping has been imposed in the section of the network where IGMP messages circulate, which technique is described below and which does allow the switch to manage SSM multicast traffic and to take into account the IP addresses of the sources of origin of the data.

The RFC 4541 specifications, edited online by the IETF (M. Christensen et al., Engineering Task Force, Network Working Group, Request for Comments 4541, May 2006; currently available at Internet address http://tools.ietf.org/html/rfc4541) describe the operation of a switch performing a function referred to as IGMP snooping so as to prevent sending all the multicast data packets through all its ports and to all the equipment connected to the ports. This IGMP snooping function consists of the switch analyzing the IP data packets containing IGMP messages and creates a table with the information of the multicast channels or groups that the switch must send through each of its ports. The switch thus sends through each of its ports only the multicast channels that the hosts connected to the port have requested. The reason that the switch must perform this snooping function is that, as previously mentioned, a switch is usually a layer 2 equipment in the OSI model and therefore neither knows nor uses layer 3 protocols such as the IP protocol.

This IGMP snooping method described in the RFC 4541 specifications has the limitation that it can only be applied when the equipment connected to a port of the switch is a host. The RFC 4541 specifications indicate that if there is a router connected to a port of the switch, the switch must send all the multicast traffic through the port.

The snooping technique has been imposed in the host to IGMP router section of the network because the IGMP protocol is simple and it is easy for a switch to interpret IGMP messages. The same does not occur in multicast communications between routers, using the PIM-SM protocol for example. In a switch located between two routers, through which the PIM-SM messages pass, the implementation of a PIM snooping function is more difficult due to the fact that the PIM-SM protocol is much more complex than the IGMP protocol: the PIM-SM protocol includes functionalities, such as for example the deletion of JOIN messages, which make it difficult for a switch interpreting PIM-SM messages to perform a snooping function.

One drawback of snooping is that multicast protocols are designed at the network layer or layer 3 and are used to set up communications between routers or between routers and hosts. A router always understands the protocols it uses. If a router receives a message in a protocol that it does not understand, it dismisses the message. Multicast routing protocols, such as IGMP or PIM-SM, are defined to be implemented in routers and their specifications do not include how intermediate layer 2 equipment through which the messages pass, but which does not participate in the message exchange, must interpret messages in the protocols. The recipient equipment of multicast protocol messages, i.e. routers, modifies its state machines depending on the messages that are received and sent. In contrast, switches performing snooping must find out the state of each state machine of the routers by interpreting the messages that the routers exchange with one another. For this reason snooping is difficult to apply in complex protocols such as the PIM-SM protocol, which is the most widely used between routers and the specifications of which define a number of state machines. The PIM-SM protocol is more complex than the IGMP protocol and further includes functions such as the deletion of JOIN messages, making snooping even more difficult, and making it much more difficult for a switch to interpret the PIM-SM messages.

Another problem with snooping is that Internet protocols evolve over the years. Every time a version of a multicast protocol is modified, such as for example the IGMP protocol or the PIM-SM protocol, the switches that apply any of the known solutions do not understand the new messages of the protocol. This has occurred, for example, in switches performing a snooping function with the IGMPv2 protocol that are not able to do this with the IGMPv3 protocol. This is because multicast protocols are designed at the network layer or layer 3 of the OSI model to be implemented in routers, and the specifications of the protocols do not describe how multicast messages are to be interpreted by the layer 2 network equipment located between a router and a host, or between two routers, and through which the messages pass.

In summary, methods based on snooping, such as IGMP snooping or PIM snooping, must interpret the information of the multicast protocol messages. Since the specifications of multicast protocols have not been defined for the protocols to be interpreted by intermediate equipment not involved in the message exchange, the interpretation can involve a complex process depending on the protocol. This process is furthermore behind the times with each new multicast protocol version, whereby the switches performing the snooping become obsolete.

SUMMARY

A purpose is to provide an improved system for managing multicast communications in a data network when the multicast traffic transmitted by routers passes through switches.

An objective of according to one implementation is for each switch to know exactly to which equipment and through which of its ports it should transmit a specific multicast traffic transmitted by a router such that the switches do not transmit superfluous traffic.

An objective according to one implementation is that the switches do not transmit superfluous traffic through any of its ports, regardless of if the equipment connected to the ports, and requesting multicast traffic to a router through the switch, are hosts or routers.

An objective according to one implementation is to simplify the tasks that the switches transmitting multicast traffic must perform, particularly preventing switches from having to perform complicated snooping functions.

An objective according to one implementation is to aid in solving the problem of latency in transmission of multicast traffic occurring in multicast protocols of the state of the art.

Methods of multicast traffic management through a switch operating in the layer 2 of the OSI (Open Systems Interconnection) model have been developed. In one implementation a router that has received from specific equipment, which can be a host or another router, a request for specific multicast traffic, sends to a switch, connected to the network interface of the router through which the router has received the request, a message containing an identification of the specific equipment and a specification of the specific multicast traffic; and in that when the switch receives through one of its ports data carrying multicast traffic, the switch, based on the destination and origin addresses of the data carrying multicast traffic, and based on the identification of the specific equipment and on the specification of the specific multicast traffic which the router has sent to the switch by means of the message, it deduces if the data carries the specific traffic that has been requested by the specific equipment, and the switch decides through which of its ports it transmits the data.

In one implementation the multicast traffic specification contained in the message that the router sends to the switch comprises information about the sources the traffic of which has been requested by the specific equipment.

In one implementation the router stores in specific records, for each of its network interfaces and for each equipment and multicast group, information about the sources the traffic of which has been requested by the equipment; the switch stores in corresponding specific records, for each equipment and multicast group, the information about the sources the traffic of which has been requested by the equipment; and the specific records of the switch are updated when the switch receives one of the messages sent by the router.

In one implementation the messages sent by the router to the switch preferably separately contain for each specific equipment:
  included source lists of a multicast group, indicating that the specific equipment wishes to receive the traffic sent by the included sources;
  excluded source lists of a multicast group, indicating that the specific equipment wishes to receive the traffic sent by all the sources of the multicast group except the excluded sources;

and the specific records stored in the router and in the switch separately contain, for each specific equipment and multicast group, the data of the included sources and the data of the excluded sources.

In one implementation the message that the router sends to the switch is preferably encapsulated in IP data packets.

In one implementation, the identification of the specific equipment contained in the message that the router sends to the switch comprises the IP address of the specific equipment. According to an advantageous solution, the switch receiving the message executes the ARP (Address Resolution Protocol) protocol to associate a MAC address to the IP address of the specific equipment.

In one implementation the switch creates a MAC and IP address table that associates the IP address and the MAC address of each equipment that send frames to a port of the switch with the port of the switch that received the frame. The switch can read the MAC address and the IP address of each frame that the switch receives in each port and store this information in the MAC an IP address table.

In one implementation the identification of the specific equipment contained in the message which the router sends to the switch comprises the MAC address of the specific equipment.

In one implementation the identification of the specific equipment contained in the message which the router sends to the switch comprises the IP address and also the MAC address of the specific equipment.

In one implementation the messages which the router sends to the switch are preferably layer 3 messages in the OSI (Open Systems Interconnection) model and when the switch receives data through one of its ports the switch analyzes the destination address of the data in order to find out if the data carries one of the messages sent by the router and if it does the switch does not transmit the data, but rather it processes it in order to read the message.

In one implementation, when a switch is connected to several routers, in order to prevent the routers from sending to the switch the messages with redundant information, each of the routers only sends the messages to the switch if it is in one of the two following cases:

the router transmits to the switch the traffic of a multicast channel;

the router receives requests for traffic of a multicast channel sent by a source which is connected to the router through the switch.

BRIEF DESCRIPTION OF THE DRAWINGS

Other advantages and features of the invention can be seen in the following description in which, with a non-limiting character, implementations of the invention are referred to in relation to the attached drawings.

FIG. 3 shows an exemplary format of group record blocks comprised in the message shown in FIG. 2.

DETAILED DESCRIPTION

Figure 1:
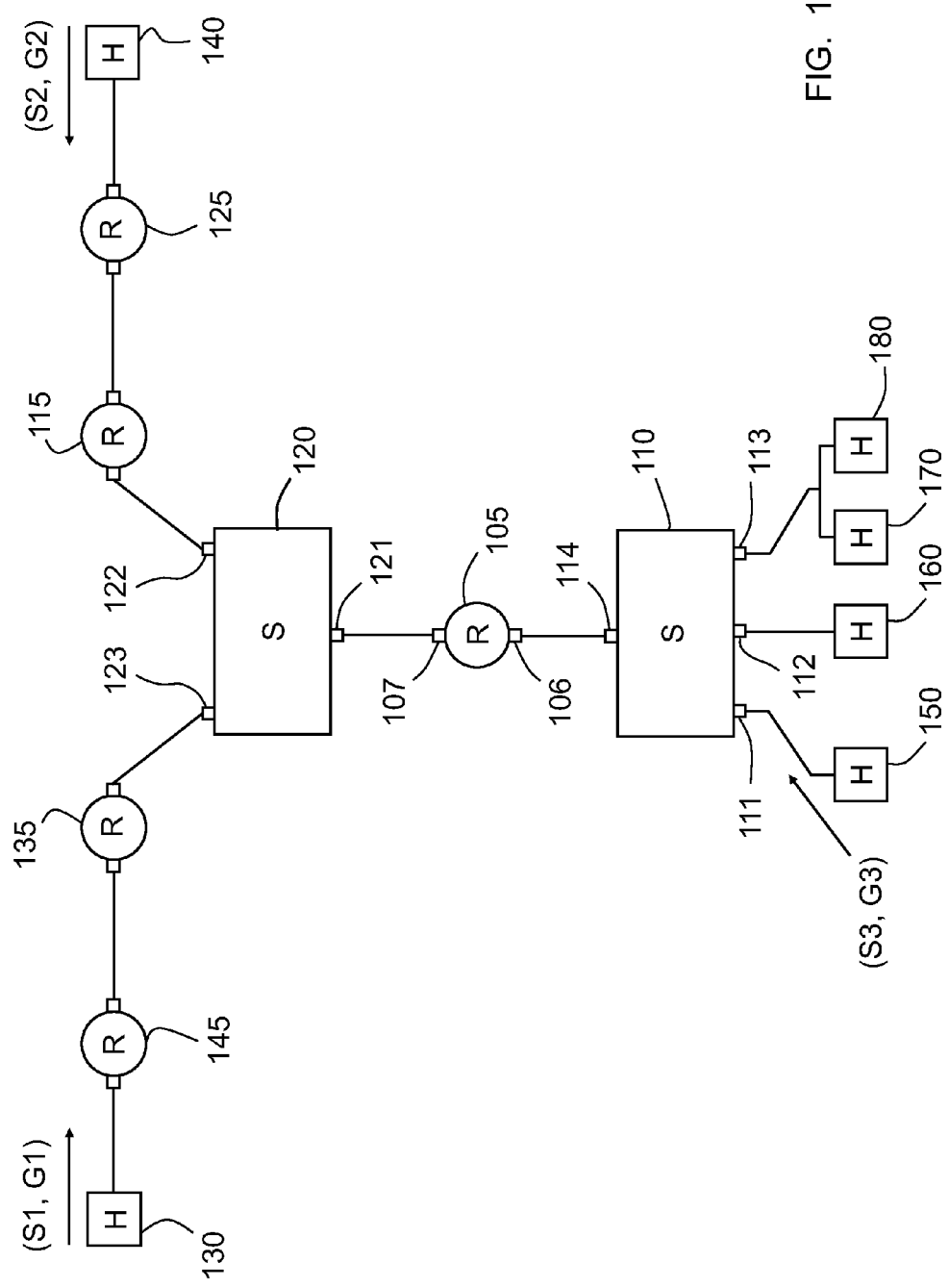
FIG. 1 schematically shows an exemplary data network in which implementations of the present invention may be applied.

The description is structured in the following sections:
1) MFP Protocol (exemplary multicast protocol useable to implement various embodiments disclosed herein)
2) Identification of equipment requesting multicast traffic from a router
3) Storage of the information of the requested multicast traffic
4) Exemplary MFP Messages
5) Operation of an improved switch implementing an exemplary MFP protocol
6) Rules of preference for the routers sending MFP messages—Example of the data network of FIG. 1

1) MFP Protocol (Exemplary Multicast Protocol Useable to Implement Various embodiments disclosed herein)

An exemplary comprises the development of multicast communications protocol, hereinafter referred to as MFP (Multicast Forwarding Protocol), is disclosed herein and useable by routers transmitting multicast traffic to inform the switches of the multicast traffic that has been requested by each equipment. To that end, in one implementation the routers may send the switches messages according to [the] MFP protocol containing the information of the multicast traffic requested by each equipment. These messages will hereinafter be referred to as MFP messages. As will be seen in detail below, in one implementation each MFP message transmits several blocks of data with information allowing the switch to accurately determine to which equipment it must send each multicast data packet reaching the switch. These blocks shall be referred to as MFP information blocks.

A MFP protocol does not need to replace the existing multicast protocols, such as the IGMP or PIM-SM protocols for example, but rather it is compatible and can be used with them. For example, a router applying the IGMP protocol for its multicast communications with hosts, or the PIM-SM protocol for its multicast communications with other routers, also applies a MFP protocol to inform a switch of the multicast traffic that has been requested by each equipment.

In one implementation each router transmits to the switch, by means of MFP messages, all the information about the multicast traffic requested from the router and which must pass through the switch, such that the switch knows exactly to which equipment it must transmit each multicast channel or multicast group coming from the router. Therefore, unlike the RGMP protocol sending information to the switch but only affecting the port where the router is connected and only for traffic the router receives from the switch, in accordance with one implementation of the present invention the information the router sends to the switch is useful in all the ports of the switch where there is equipment that has requested multicast traffic from the router, whether the equipment is hosts or routers, and the information can relate both to multicast traffic going from the switch to the router and to multicast traffic going from the router to the switch.

In an MFP protocol, since MFP messages can affect all the ports of the switch, the router must somehow communicate to the switch which port each MFP information block it sends relates to. In one implementation this consists of not identifying which port of the switch each MFP information block affects, but rather identifying which specific equipment each MFP information block relates to. Based on the identification of the equipment which each MFP information block relates to, it is the switch that locates which port of the switch the equipment is connected to.

Another feature of a MFP protocol in one implementation is that it takes into account the origins of the multicast data emitting sources and it can manage SSM multicast traffic.

2) Identification of the Equipment Requesting Multicast Traffic from a Router

In one implementation routers executing a MFP protocol separately identify for each network interface of the router and each equipment that has requested multicast traffic from the router, the information of the multicast traffic that the router must transmit to each equipment through the network interface. In one implementation the router uses an identifier that allows identifying each equipment requesting multicast traffic, and includes this identifier in the MFP information blocks of the MFP messages that the router sends to the switches. The router can use, for example, the IP address of the equipment or the MAC address of the equipment as an identifier of each equipment requesting multicast traffic. It can also use both identifiers simultaneously or other different identifiers.

If the identifier used is the unicast MAC address of the equipment requesting the multicast traffic, given that a switch is layer 2 equipment in the OSI model and knows which of its ports each MAC address is connected to, with the MAC address the switch already has all the information necessary for knowing through which port it should transmit the traffic indicated in the MFP message.

In another implementation, the switch knows which of its ports an IP address corresponds to by executing the ARP (Address Resolution Protocol) protocol. The ARP protocol is a protocol belonging to the state of the art and it allows associating a MAC address to an IP address. The ARP protocol is not usually executed in the switches, but rather in the layer 3 equipment in the OSI model. However, a person skilled in the art would have no difficulty in applying it in a switch which knows, because it has been indicated by means of an MFP message, an IP address.

If the identifier includes both the IP address and the MAC address of the equipment requesting the multicast traffic, some advantages are obtained. For example, it is not necessary for the switch to use the ARP protocol, or another similar protocol, to associate a MAC address to an IP address, since based on the MAC address the switch already knows which port each equipment is connected to. Another advantage of the identifier including the IP address in addition to the MAC address is that a MFP protocol can then also operate in layer 3 switches in the OSI model, which is equipment that has a functionality similar to the functionality of a conventional layer 2 switch but operates with layer 3 addresses.

The router can use any other equipment identifier allowing the switch to know in which port each equipment is connected, i.e. any data identifying equipment requesting multicast traffic. The data must be included in the messages that the equipment sends through the switch, such that the switch can detect which port each identifier is associated to or, in other words, which port each equipment requesting multicast traffic is connected to.

As a multicast group identifier, in one implementation a MFP protocol uses the layer 3 multicast address in the OSI model, i.e. the multicast group IP address, which is more accurate than the layer 2 address because 32 multicast IP addresses correspond to each multicast MAC address, as explained above. This is another additional advantage of a MFP protocol.

In the preceding explanation it has been assumed that the routers operate with version 4 of the IP protocol (IPv4) and therefore the multicast communications between a router and hosts uses the IGMP protocol. However, as a person skilled in the art will easily understand, the routers may operate with version 6 of the IP protocol (IPv6), in which case the multicast communications use the MLD protocol. The ARP protocol for associating a MAC address to a IP address is not used in the IPv6 protocol, but rather the ND (Neighbour Discovery) protocol, but the purpose is similar. The switch can also use the ND protocol to find out which of its ports each equipment using an IP address according to the IPv6 protocol is connected to.

3) Storage of the Requested Information of the Multicast Traffic

In one implementation, an MFP protocol allows storing information of the different requests for traffic of different multicast protocols, including the two most common protocols: IGMP and PIM-SM.

An explanation will be provided below as to how a router implementing the present invention stores the information of the multicast traffic requested by each equipment. Two exemplary forms of management are explained.

In a first exemplary management form, which adopts to one degree or another the form in which the IGMP and PIM-SM protocols of the state of the art work, a router stores the multicast routing information depending on its network interfaces, and it only stores the IP address of each equipment requesting multicast traffic during the time necessary for sending an MFP message. The multicast routing table of the router only stores through which network interface of the router the multicast traffic request has arrived so that the requested traffic is sent by the network interface. The router sends an MFP message when it receives an IGMP message or a PIM-SM message with a multicast traffic request, taking advantage of the fact that the message contains the identifier of the equipment requesting the multicast traffic, before the information is lost because it is not stored in the multicast routing table of the router.

In a second exemplary management form, a router stores the information of the multicast traffic requests associating the information with the identifier or the identifiers of each equipment that has sent a multicast traffic request.

This second exemplary management form has the advantage that it allows reducing latency, as a result of the fact that the router accurately stores the information of the multicast traffic that each equipment has requested and therefore can immediately cut off the multicast traffic transmission when there is no longer any equipment interested in receiving the traffic. The problem of latency in the PIM-SM protocol of the state of the art consists of, for example, when a router receives through one of its network interfaces a PRUNE (S,G) type PIM-SM message, i.e. a message requesting that the router stops transmitting the multicast traffic from channel (S,G), the router does not immediately cut off the traffic through the network interface, but rather it waits for an amount of time, 3 seconds by default, so that other equipment receiving channel (S,G) transmitted through the network interface can send a JOIN(S,G) message to cancel the effect of the PRUNE (S,G) message and to thus continue receiving the channel. If there is no other equipment receiving channel (S,G) transmitted through the network interface of the router, the router will have been unnecessarily transmitting this traffic. In contrast, as a result of this second preferred management form according to the invention, the router accurately knows that there is no other equipment receiving the traffic from channel (S,G) transmitted through the network interface, because the router accurately stores the information of the multicast traffic that each equipment has requested, and therefore the router can immediately cancel the transmission of the channel (S,G) when it receives the PRUNE (S,G) message. Unnecessary latency times, involving unnecessary bandwidth consumption, are thus prevented.

To apply this second exemplary management form, it is possible to modify multicast protocols applied by routers, for example the PIM-SM protocol or the IGMP protocol, so that the routers store, in the state records used by the multicast protocol, information identifying each equipment that has requested a specific multicast traffic.

However, another advantageous solution is also provided that does not require modifying the multicast protocols applied by the routers. In one implementation this solution consists of the routers storing the information identifying each equipment that has requested a specific multicast traffic in specific records, without needing to modify the state records used in the multicast protocol of the state of the art. To that end, a router applying this solution uses specific state records which are common for all multicast protocols. That is, they do not depend on if the multicast protocol applied by the router is the IGMP protocol, the PIM-SM protocol or another multicast protocol.

In one implementation these specific state records are similar to the state records used by the IGMP protocol, but using two state records for each network interface, multicast group and equipment of origin requesting the multicast traffic: an INCLUDE record for the INCLUDE sources and another EXCLUDE record for the EXCLUDE sources. Hereinafter these specific state records shall be referred to as MFP records of the router. The structure of these MFP records is as follows:
INCLUDE MFP Record: (interface, equipment-ID, multicast-address, filter-mode=INCLUDE, {source-list})
EXCLUDE MFP Record: (interface, equipment-ID, multicast-address, filter-mode=EXCLUDE, {source-list}, Group-Timer)
where:
  "interface" is a local identifier identifying the network card of the router in which multicast traffic has been requested, i.e. the network interface of the router that has received a message requesting multicast traffic.
  "equipment-ID" is an identifier identifying the equipment that has sent the message to the router requesting multicast traffic. As previously explained, this identifier can be the IP address of the equipment, the MAC address, both addresses simultaneously or another type of identifier.

"multicast-address" is the address of the multicast group.

"filter-mode" is the mode of the MFP record, which can be INCLUDE or EXCLUDE. The INCLUDE mode indicates that the "source-list" of the MFP record is an INCLUDE source list, i.e. the router must transmit the multicast traffic sent by each and every one of the sources of the list. The EXCLUDE mode indicates that the "source-list" is an EXCLUDE source list, i.e. the router must transmit the multicast traffic sent by each and every one of the sources sending in the multicast group, except the sources of the list.

"source-list" is a list of elements (source-address, source-timer), "source-address" being the IP address of a source sending multicast traffic in the multicast group to which the MFP record relates, and "source-timer" being a timer associated to the source.

"Group-Timer" is a timer the function of which is to eliminate the record with EXCLUDE "filter-mode" when the timer reaches the value zero.

The router updates the source-timer of each source-address every time it receives a message requesting multicast traffic sent by the source. These timers are useful as a security mechanism to prevent a router from transmitting a multicast channel indefinitely. For a router to continue transmitting traffic, it is necessary for the equipment requesting the multicast traffic to re-send its requests to the router every so often.

In one implementation, for each network interface of the router, equipment of origin and multicast group the router therefore stores two MFP records: one with EXCLUDE filter-mode and the other with INCLUDE filter-mode.

The record with EXCLUDE filter-mode differs from the record with INCLUDE filter-mode in that it incorporates the field referred to as Group-Timer, containing a timer the function of which is to eliminate the record with EXCLUDE filter-mode when the timer reaches the value zero.

The MFP records with INCLUDE filter-mode are automatically eliminated when the list of {source-list} is empty and therefore they do not need a Group-timer to be eliminated.

Each message that the router receives through a specific network interface, from a specific host and in relation to a specific multicast group only affects the MFP record of the network interface, host and multicast group.

If the MFP record has an INCLUDE filter-mode the timers operate as follows: for a specific equipment identifier, a specific multicast group, and a specific included source-address, as long as the source-timer is greater than zero the router will send MFP messages to the switch so that the switch transmits through the port where the equipment is connected the multicast traffic of the channel (source, multicast group); when the source-timer reaches zero, the router will send an MFP message to the switch so that it stops transmitting the traffic and will eliminate the source from the INCLUDE source list of that multicast group.

If an MFP record has an EXCLUDE filter-mode for group G, the router sends an MFP message to the switch so that the latter may transmit, through the port where the identified equipment is connected, the traffic of group G of each and every one of the sources except the sources of the source-list.

As long as, for a specific network interface of the router, a specific equipment requesting traffic and a specific multicast group, there are only INCLUDE sources or there are only EXCLUDE sources, the router only needs one MFP record with INCLUDE or EXCLUDE filter-mode, respectively.

However, in one implementation if there are different requests for traffic with information of INCLUDE sources and EXCLUDE sources, the router then stores the information in two records: one with INCLUDE filter-mode and the other with EXCLUDE filter-mode.

This is an important difference with regard to the IGMPv3 protocol defined in RFC 3376, in which the router has a unique state record for each network interface of the router. This unique record can have an INCLUDE filter-mode or an EXCLUDE filter-mode, and the router must apply several mechanisms to change the filter-mode from INCLUDE to EXCLUDE and vice versa. This creates a series of complications that have been avoided in the MFP record according to the invention as a result of the fact that the latter maintains two different state records: one with INCLUDE filter-mode and the other with EXCLUDE filter-mode.

By means of MFP records, the router can store in a common manner the information of the multicast traffic requested by different equipment, whether the latter are host or routers. The MFP records allow defining the multicast traffic in a common manner for all the protocols.

The advantage of using two MFP records, one with INCLUDE filter-mode and another with EXCLUDE filter-mode, is that it allows storing the information corresponding to all the multicast traffic requests of the IGMP protocol and also the information corresponding to the following types of messages of the PIM-SM protocol: JOIN/PRUNE (S,G), JOIN/PRUNE (*,G) and JOIN/PRUNE (S,G,rpt). The meaning of these types of messages of the PIM-SM protocol is known by a person skilled in the art and is explained in the RFC 4601 specifications.

Another important difference of the MFP records in relation to the state records of the IGMPv3 protocol is that MFP records identify the equipment of origin requesting multicast traffic, whether by means of its IP address, by means of its MAC address or by using both identifiers.

The correspondence between the JOIN/PRUNE (S,G), JOIN/PRUNE (*,G) and JOIN/PRUNE (S,G,rpt) messages of the PIM-SM protocol and MFP records is described below.

The JOIN(S,G) message corresponds with an MFP record with INCLUDE filter-mode in relation to group G and source S. If the router receives a PRUNE (S,G) message, it eliminates the source S from the INCLUDE sources source-list of the MFP record with INCLUDE filter-mode.

The JOIN (*,G) message corresponds with an MFP record with EXCLUDE filter-mode in relation to group G and with an empty source-list. If the router receives a PRUNE (*,G) message, it eliminates the MFP record with EXCLUDE filter-mode.

The PRUNE (S,G,rpt) message corresponds with an MFP record with EXCLUDE filter-mode in relation to group G and including the source S in the EXCLUDE sources source-list. If the router receives a JOIN(S,G,rpt) message, it eliminates the source S from the source-list of the MFP record with EXCLUDE filter-mode.

Now there is only one of the traffic requests of the PIM-SM protocol to be discussed: the (*,*,RP) JOIN/PRUNE messages, which cannot be stored in the MFP records as such records have been defined in the foregoing.

A PIM-SM JOIN/PRUNE (*,*,RP) type message is sent by a network interface of a router R1 to a network interface of another router R2 to request that router R2 transmits to router R1 all the data packets of the multicast traffic the multicast group of which is managed by the router indicated in parameter RP, which is an address identifying the router RP (Rendezvous Point). Router R2 checks the origin address of the multicast data packets and, if they come from router RP, it sends them to router R1.

Now assume that there is a switch between router R1 and router R2. A first solution for router R2 to store and send to the switch the information of the multicast traffic requested by router R1 by means of (*,*,RP) message consists of the PIM-SM protocol executed in router R2 creating an MFP record for each multicast traffic that it must transmit to router R1 because it comes from router RP. This solution can also be applied to new multicast routing protocols defining new types of multicast traffic requests, whereby it is possible to incorporate new multicast protocols in routers without needing to modify the switches implementing the present invention.

A second solution, which does not require modifying the multicast protocols, consists of using, in order to store this information, an MFP record for an inexistent multicast group, with a multicast address outside the range reserved for the multicast addresses, and with a unique data source corresponding with the IP address of router RP. For example, the address FF.FF.FF.FF in hexadecimal notation, which is a value that is outside the range reserved for the multicast addresses, can be used. The router can thus store the (*,*,RP) state information in the MFP records and transmit it to the switch by means of MFP messages.

As seen, by means of the MFP records a router can store in a common manner the information of the multicast traffic requested by different equipment, whether the latter are hosts or routers and regardless of the multicast protocol they use.

4) Exemplary MFP Messages

Exemplary MFP messages that a router according to the invention uses to indicate to the switches how they should transmit a specific multicast traffic will be described below. In one implementation the routers send MFP messages to the switch periodically and also when there is any change in the MFP records of the router that must be transmitted to the switch.

In one implementation the MFP messages that a router sends to a switch through one of its network interfaces only contain information relating to multicast traffic requests that have reached the router through the network interface. If there are several network interfaces of the router connected to a single switch, each one will send its respective information in the form of MFP messages. If there are several routers connected to a single switch, the operation is similar: each network interface of each router sends its MFP messages to the switch with information relating to the multicast traffic requests received by the network interface.

In one implementation a MFP protocol operates in both multicast communications between routers and in multicast communications between a router and hosts. In one implementation the MFP protocol defines a new system to request multicast traffic, which describes all the possible multicast traffic requests of all the protocols and which is easy to extend if in the future new multicast protocols appear which request traffic differently.

In one implementation the MFP messages that the routers send to the switches are encapsulated in IP datagrams addressed to a pre-established multicast address and with a specific protocol number. The IANA (Internet Assigned Numbers Authority) is responsible for assigning multicast addresses and protocol numbers for being used in protocols such as a MFP protocol. However, for the sake of greater clarity in the explanation it is assumed that the multicast address used is 224.0.0.X, as if the IANA has authorized the use of this multicast address for the MFP protocol.

The switch receiving these MFP messages sent by the router to address 224.0.0.X stores the information contained therein in MFP state records such as those described above for the router and transmits the multicast traffic according to the information.

An advantage of sending MFP messages to a predetermined multicast address is that it makes it easier for the switch to detect MFP messages, since MFP messages are the only messages addressed to multicast address 224.0.0.X.

The multicast address used in MFP messages can optionally, or concurrently, be configured manually in the switches and in the routers.

Figure 2:
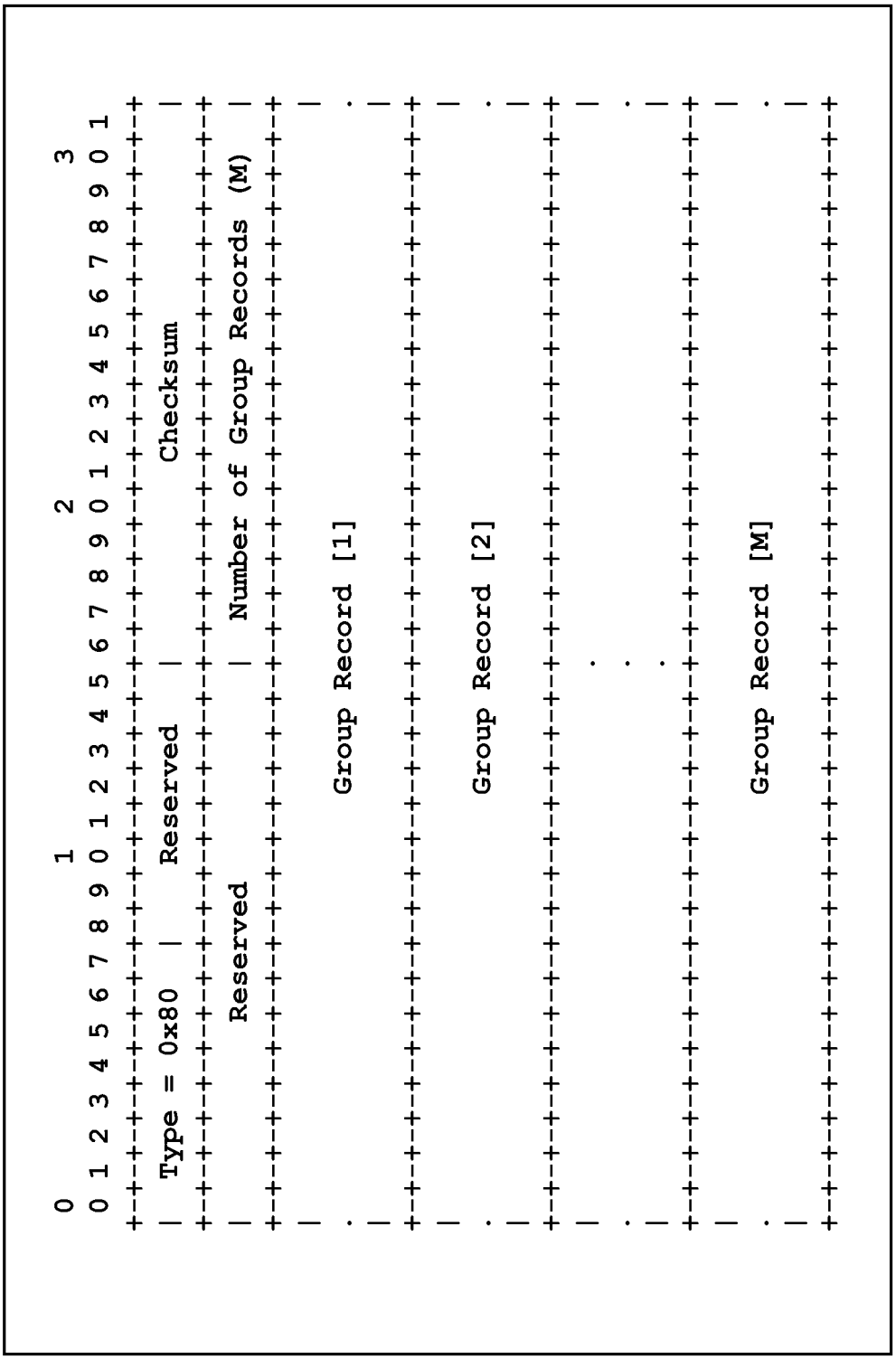
FIG. 2 shows an exemplary format of a message sent from a router to a switch in one implementation so as to inform the switch how to transmit a specific multicast traffic.

FIG. 2 shows an exemplary format of an MFP message according to a MFP protocol. In the implementation of FIG. 2, the MFP messages are similar to IGMP messages and, like the latter, are encapsulated in IP datagrams. The "Type" field allows distinguishing between an IGMP message and an MFP message. FIG. 2 shows that the value 0x80 in hexadecimal format has been chosen for example to identify MFP messages in the "Type" field. Another way of distinguishing MFP messages would be to use the protocol number of the header of the IP datagram.

In one implementation each MFP message is made up of a group of information blocks referred to as "Group Record". Each "Group Record" block contains the information relating to an equipment and to a specific multicast group. In each "Group Record" the router indicates to the switch how it should transmit to a specific equipment the traffic of a specific multicast group. The field referred to as "Number of Group Records (M)" indicates the number M of "Group Record" blocks containing the MFP message.

FIG. 3 shows in detail an exemplary internal format of a "Group Record" block of an MFP message in one implementation. As stated, in one implementation each "Group Record" block contains information relating to a specific equipment and to a specific multicast group. The equipment is identified by means of its IP address and/or its MAC address in the fields referred to as "Layer 3 Identifier" and "Layer 2 Identifier". The "Layer 3 Identifier" field is provided for containing the IP address of the equipment, taking up 32 bits or 4 bytes, whereas the "Layer 2 Identifier" field is provided for containing the MAC address of the equipment, taking up 48 bits or 6 bytes. Therefore in FIG. 2 the "Layer 2 Identifier" field extends in a continuation indicated "Layer 2 Identifier (cont.)". The address of the multicast group is indicated in the field "Multicast Address". Each "Group Record" block can send information about a specific number of sources sending multicast traffic. The number of sources N is indicated in the "Number of Sources (N)" field. Each of these sources is identified by its IP address in the "Source Address [1]", "Source Address [2]", . . . , "Source Address [N] fields".

In the "Group Record" block of FIG. 2, the "Record Type" field indicates to the switch how it should interpret the information contained in the "Group Record" block. The meaning of the different values of the "Record Type" field block is described below. The abbreviated description of each value is indicated between parentheses next to the value, in accordance with standard practice in the IGMP protocol. To facilitate an implementation compatible with the IGMP protocol, the same values 1 and 2, and the same corresponding abbreviated descriptions have been used for the "Group Record Type" field of the IGMP Membership Report type messages as those described in section 4.2.12 of the RFC 3376 specifications. New values 8, 9, 10 and 11 and their corresponding abbreviated descriptions are furthermore used.

The "Record Type" field indicates to the switch how it should interpret the information of each "Group Record" data block. To facilitate compatibility with the IGMP protocol, a meaning similar to the meaning of the IGMP protocol has been chosen for each value of the Record Type field. Table 1 included at the end of this document shows the name and the abbreviation that have been assigned to each value of the "Record Type" field.

Values 1 and 2 of "Record Type" field are used so that the router indicates to the switch an INCLUDE source list or an EXCLUDE source list, respectively.

Record Type=1 (abbreviated description: MODE_IS_IN-CLUDE): the sources identified in the "Source Address [1]", "Source Address [2]", ..., "Source Address [N]" fields are an INCLUDE source list for the multicast group and the equipment that the "Group Record" block refers to. The switch is informed that it should transmit to the equipment the multicast traffic sent by each and every one of these sources in the multicast group.

Record Type=2 (abbreviated description: MODE_IS_EX-CLUDE): the sources identified in the "Source Address [1]", "Source Address [2]", ..., "Source Address [N]" fields are an EXCLUDE source list for the multicast group and the equipment that the "Group Record" block refers to. The switch is informed that it should transmit to the equipment the multicast traffic sent by each and every one of the sources in the multicast group, except the sources indicated in the list.

Values 8 and 9 are used to update an INCLUDE source list that the router had already provided to the switch in one or several previous MFP messages.

Record Type=8 (abbreviated description: ALLOW_NEW_SOURCES_INCLUDE): the sources identified in the "Source Address [1]", "Source Address [2]", ..., "Source Address [N]" fields are INCLUDE sources to be added, for the multicast group and the equipment that the "Group Record" block refers to, in the INCLUDE source list that the router had provided to the switch in previous MFP messages.

Values 10 and 11 are used to update an EXCLUDE source list that the router had already provided to the switch in one or several previous MFP messages.

Record Type=10 (ALLOW_NEW_SOURCES_EX-CLUDE): the sources identified in the "Source Address [1]", "Source Address [2]", ..., "Source Address [N]" fields are EXCLUDE sources to be deleted, for the multicast group and the equipment that the "Group Record" block refers to, in the EXCLUDE source list that the router had provided to the switch in previous MFP messages.

The formats illustrated in FIGS. 2 and 3 correspond to the case in which the router sends information to the switch about equipment that uses version 4 of the IP protocol (IPv4), and therefore the IP addresses of the equipment take up 32 bits or 4 bytes. The format of FIG. 3 also relates to equipment using physical Ethernet or MAC Address type addresses taking up 48 bits or 6 bytes. However, a MFP protocol can also be used with other layer 3 protocols, such as version 6 of the IP protocol (IPv6) for example, in which the addresses take up 128 bits or 16 bytes, and with other layer 2 protocols. To that end, it is enough for any field of the "Group Record" block of FIG. 3 or of the MFP message of FIG. 2 to identify which type of format is being used. For example, any of the "Reserved" fields can be used for identifying the type of layer 3 protocols and layer 2 protocols used. Obviously the format of the MFP messages and of the "Group Record" blocks must be suitably broad because using the IPv6 protocol requires 16-byte fields to store the IP addresses.

Another advantageous feature of the present invention is that it uses layer 3 messages, whereby it can operate on different data link layers or layer 2 in the OSI model and it furthermore operates both in switches communicating host with routers and in switches communicating routers with routers. Therefore, by means of a MFP protocol, many problems associated with multicast traffic in layer 2 equipment are solved. In one implementation this is accomplished without using other protocols or snooping techniques in any section of the network.

5) Operation of an Improved Switch Implementing an Exemplary MFP Protocol

In one implementation switches according to the invention store an MFP record as do routers using the MFP protocol. In one implementation the structure of the MFP records in the switches is the same or similar to the structure of the MFP records in the routers, with the difference that the MFP records in the switches do not contain the "interface" field (relating to the network interface of the router in the MFP records of the routers). In one implementation the structure of the MFP records in the switches is therefore as follows:

Record MFP: (equipment-ID, multicast-address, filter-mode, source-list)

where the meaning of the "equipment-ID", "multicast-address", "filter-mode" and "source-list" fields is the same as for the MFP records of the routers.

As previously stated, the information that the router sends to the switch in MFP messages can affect all the ports of the switch where there is equipment that has requested multicast traffic from the router. The MFP messages contain, in the MFP information blocks, an identification of the equipment that has requested multicast traffic and the switch locates in which of its ports each equipment is connected. Therefore, it is not necessary for the MFP records in the switches to contain a field relating to the ports of the switch. As explained above, if the equipment identifier used in the MFP messages is the IP address of each equipment, in order to know to which of its ports the equipment is connected, the switch can execute the ARP protocol associating a MAC address to an IP address or use a MAC and IP address table as previously explained. If the equipment identifier used includes the MAC address, it already knows to which port the equipment is connected based on the address.

In one implementation every time a switch according to the invention receives an MFP message sent by a router, it updates the content of its MFP records according to the information contained in the different "Group Record" of the MFP message according to the operation of Table 2. Therefore there is a correspondence between the MFP records of the switches and the MFP records of the routers.

In one implementation a switch according to the invention furthermore updates the "source-timers" timers of its MFP records when it receives an MFP message from a router in which it is indicated that the source associated to a "source-timer" is an INCLUDE source.

Table 2 (at the end of this document) illustrates the operation of an improved switch in one implementation that applies an MFP protocol. In the example shown, in its initial state the switch has, for a specific multicast group G and a specific identified equipment, two state records for the multicast group G (a record with INCLUDE filter-mode and a record with EXCLUDE filter-mode) because it has as many INCLUDE sources as EXCLUDE sources.

Column 1 of Table 2 shows the initial state of the MFP records, column 2 shows the received MFP message, column 3 shows the end state of the MFP records and column 4 shows the actions performed by the switch. The following nomenclature is used:

(A+B) means the union of the sources sets A and B.
(A*B) means the intersection of the sources sets A and B.

(A−B) means the sources set A minus the sources of A that are also found in B.

INCLUDE (A), indicates that the switch has an MFP record with INCLUDE filter-mode with a sources set A.

EXCLUDE (Y) indicates that the switch has an MFP record with EXCLUDE filter-mode because there are EXCLUDE sources, Y being the EXCLUDE source list.

GMI is a parameter referred to as Group Membership Interval containing a time value. In one implementation, by default, it has a value of 260 seconds.

T (S) is the "source-timer" timer of source S.

GT is the Group Timer, i.e. the timer of the MFP record with EXCLUDE filter-mode which is used to eliminate the record when the timer reaches zero.

DEL(A) means that the IGMP router deletes the sources of list A from the record.

Table 2 illustrates an exemplary operation of MFP messages according to one implementation. Some aspects of Table 2 will be briefly explained below for the sake of clarity.

For example, in the first row the switch has two initial MFP state records:

INCLUDE(A)
EXCLUDE(Y)

and the switch receives an IS_IN(B) type MFP message indicating that the set of INCLUDE sources of a specific multicast group has changed from set A to a new set B. The end state of the switch is therefore:

INCLUDE(B)
EXCLUDE(Y)

The switch furthermore initializes the timers of the sources of set B and eliminates all those sources of set A that are not in set B.

The ALLOWIN (B) and BLOCKIN (B) messages modify the sources of the INCLUDE record, whereas the ALLOWEX (B) and BLOCKEX (B) messages modify the sources of the EXCLUDE record. In the same manner, the IS_IN(B) message only affects the INCLUDE record and the IS_EX(B) message only affects the EXCLUDE record. This separation of messages affecting the INCLUDE and EXCLUDE records provides simplicity.

In order for a switch to decide if it should transmit a specific multicast traffic through one of its ports, a switch according to the present invention may apply an algorithm taking into account the MFP records of the switch and, in one implementation, applying the following rules:

for a specific port of the switch, a specific multicast group G, and a specific INCLUDE source S, if there is an MFP record of the switch relating to any equipment connected to the port and relating to the multicast group G, the filter-mode of which is INCLUDE and it includes in its "source-list" the source S, the switch transmits the multicast traffic of channel (G,S) through the port;

if for the port of the switch and the multicast group G there are MFP state records of the switch relating to any equipment connected to the port and relating to the multicast group G, the filter-mode of which is EXCLUDE, the switch will furthermore transmit through the port the multicast traffic of all the sources except that of the set resulting from the intersection of all the "source-list" lists of the state records with EXCLUDE filter-mode for the equipment connected to the port and relating to the multicast group G.

Figure 4:
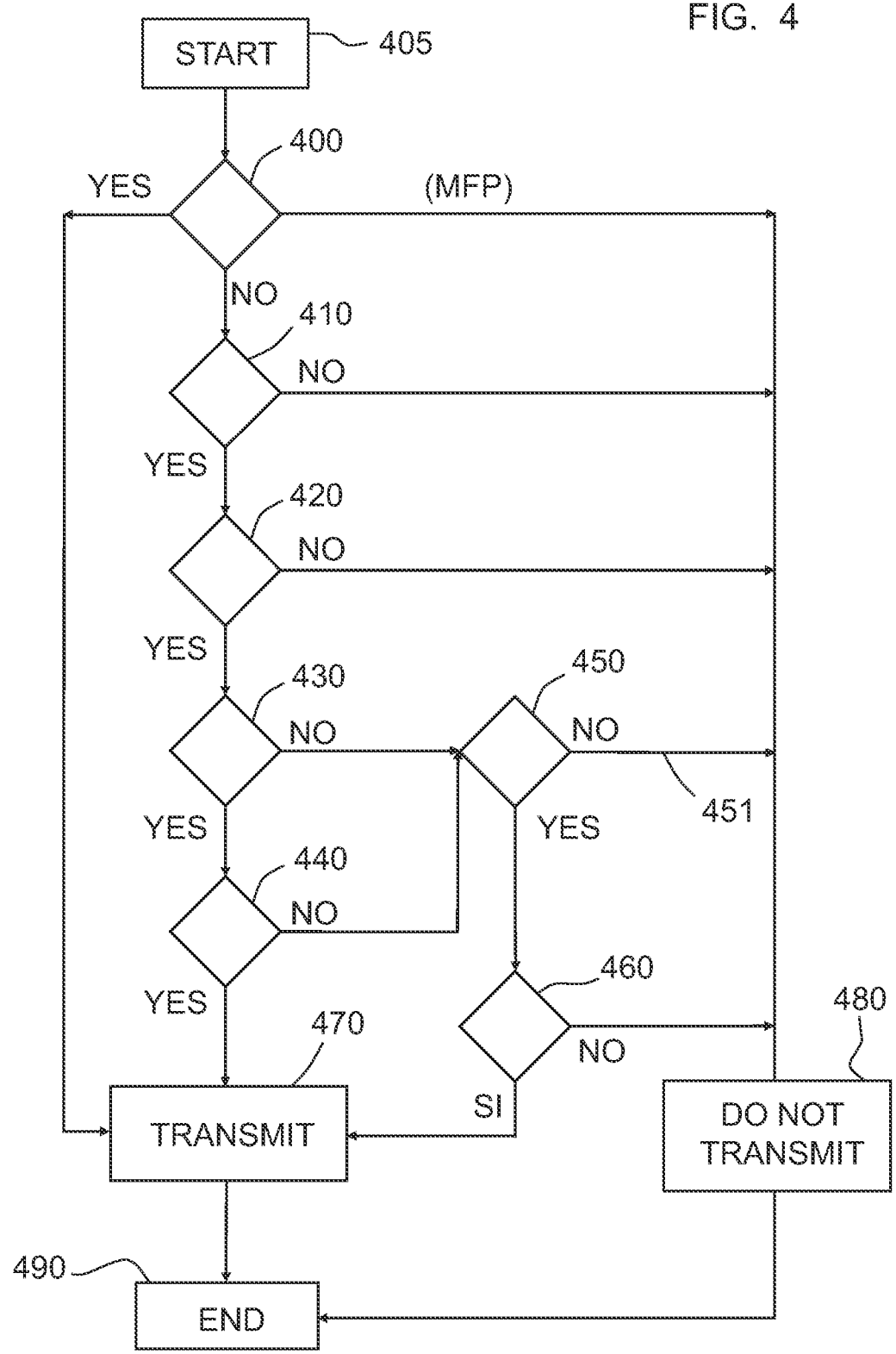
FIG. 4 is a high level block diagram illustrating an algorithm applied by a switch according to one implementation for each of its ports when it receives a multicast traffic data packet, in order to decide if it should transmit the data packet through the port.

The flowchart in FIG. 4 illustrates an exemplary algorithm executed in a switch, according to one implementation, when it receives a multicast traffic data packet. I In one implementation the switch executes the algorithm of FIG. 4 for each of its ports in order to decide if it should transmit through the port the multicast traffic data packet that it has received.

The exemplary algorithm begins at 405 for a specific port of the switch. First, the switch checks 400 to see if the multicast group address of the data packet, which is the destination IP address of the data packet, corresponds to a multicast address of those used by multicast protocols to send multicast messages (for example IGMP messages, PIM-SM messages or MFP messages). These multicast addresses for multicast messages are usually within the range 224.0.0.0 to 224.0.0.255. If the multicast group address of the data packet corresponds to the range of addresses used by the protocols, the switch sends 470 the data packet through all its ports except if the multicast address corresponds to that used in the MFP protocol, in which case the router 480 does not transmit the data packet. In other words, if the switch sees that the data packet it has received carries a message of a multicast protocol other than the MFP protocol, such as for example an IGMP message, a PIM-SM message or other type of message (because the multicast address of the data packet is within the range of addresses reserved for the messages), the switch transmits 470 the data packet through all its ports because the IGMP message, PIM-SM message or other type of message is intended for another equipment and simply passes through the switch. In contrast, if the switch sees that the data packet it has received carries an MFP message (because the multicast address of the data packet is within the range of addresses reserved for MFP messages), the switch does not transmit 480 the data packet because the MFP message is intended for the switch (an MFP message is a message sent by a router and intended for a switch connected to the router). In this case, the switch processes the MFP message and, based on the information contained in the "Group Record" blocks of the message, updates its MFP records as explained above.

If the multicast address of the data packet is not within the range of addresses used by the multicast protocols, it means that the data packet does not carry a multicast message but rather multicast traffic intended for a host or a router that has requested it. In this case the switch checks 410 if any of its MFP records relates to the same multicast group as the data packet. If not, the switch does not transmit 480 the data packet. If it does, it is checked 420 if among the MFP records of the switch relating to the same multicast group as the data packet there is any having an "equipment-ID" identifying equipment connected to the port for which the algorithm of FIG. 4 is being executed. If not, the switch does not transmit 480 the data packet. If it does, it is checked 430 if there is an MFP record of the switch, among those identified in the previous check 420, having an INCLUDE filter-mode. If there is, check 440 is performed. If not, check 450 is performed.

It is checked in 440 if the MFP record of the switch with INCLUDE filter-mode which has been detected in the preceding check 430 contains in its "source-list" the source which has sent the data packet (identified by the origin IP address of the data packet), and furthermore if the source-timer associated to the source is greater than zero. If it is, the switch transmits 470 the data packet through the port. If it is not, check in 450 is performed.

It is checked in 450 if there is a record with EXCLUDE filter-mode. If not, the switch does not transmit 480 the data packet. When the MFP record of the switch exists with EXCLUDE filter-mode, check 460 is performed, which takes into account the intersection of the sets of EXCLUDE sources of all the MFP records of the switch with EXCLUDE filter-mode relating to the multicast group and to equipment connected to the port. If in the "source-list" lists of all these MFP records of the switch with EXCLUDE filter-mode there is a same EXCLUDE source coinciding with the source sending the data packet, the switch does not transmit 480 the data packet. If there is not, the switch transmits 470 the data packet.

Once the data packet has been transmitted 470 or not transmitted 480 through the port of the switch, the algorithm ends 490 for the port. Then the algorithm of FIG. 4 is executed for another port of the switch until the algorithm has been executed for all the ports of the switch.

The process described in FIG. 4 clearly illustrates that, unlike the systems of the state of the art used today, a switch according to the invention does not need to perform a snooping function of the data packets carrying multicast messages (consisting of interpreting the multicast messages to extract the information of the groups or multicast channels that the switch must send through each of its ports). In contrast, the switch according to the invention only needs to obtain the destination IP address and the origin IP address of the data packets reaching it through its ports, since the switch uses its own MFP records, that it updates based on the MFP messages sent by the routers, in order to deduce the traffic of the multicast groups or channels that it must send through each of its ports. As a result, systems according to the invention do not need to depend on the multicast protocol used. There is no technical difficulty in a switch for obtaining the destination and origin IP addresses of a data packet, so it will not be explained in further detail.

In one implementation the function consisting of establishing the rules that the switch must follow for transmitting multicast traffic, based on identifiers of the equipment connected to each port, is a method similar to the method used in the protocols of the state of the art for managing unicast traffic transmission. As a result, it is possible to use known specialized hardware formed by ASIC (Application-Specific Integrated Circuit) circuits to perform the function. A higher processing speed is thus obtained than if software is used. It is also possible to use specific hardware based on known ASIC circuits transmitting traffic based on IP addresses.

Another additional advantage of the present invention is that if the router transmits to the switch the multicast routing information, i.e. the information indicating to the switch how it should transmit the multicast traffic, depending on identifiers of the equipment connected to the switch, this multicast routing information continues to be valid even if a port of the switch fails. If a port of a switch fails and the switch uses a protocol to prevent closed loops when there are redundant connections, such as the Spanning Tree Protocol for example, the multicast routing information continues to be valid for the switch, since the information is stored depending on equipment identifiers and not depending on the ports of the switch. The switch can activate a new port and send through this port the multicast traffic it was sending through the port that failed.

6) Rules of Preference for the Routers Sending MFP Messages—Example of the Data Network of FIG. 1

FIG. 1 shows an exemplary data network with five routers 105, 115, 125, 135, 145 and two switches 110 and 120 implementing the present invention. It also shows six hosts 130, 140, 150, 160, 170 and 180.

Hosts 130, 140 and 150 act as sources which send multicast traffic through channels (S1,G1), (S2,G2) and (S3,G3), respectively.

Hosts 150, 160, 170 and 180 can request multicast traffic by sending to the network interface 106 of the router 105 IGMP messages which pass through the switch 110 located between the hosts and router 105. Router 105 receives through its network interface 106 these IGMP messages with multicast traffic requests and sends through its network interface 107 corresponding requests, in the form of PIM-SM messages, to routers 115 and 135. These PIM-SM messages pass through the switch 120 located between the router 105 and the routers 115 and 135.

Host 150 in turn acts as a source which sends channel (S3, G3) and as a receiver that requests multicast traffic sent by other sources, for example the traffic of channels (S1, G1) and (S2, G2) sent by hosts 130 and 140.

Hosts 130 and 140 likewise acting as sources can also act as receivers requesting multicast traffic by means of IGMP messages they send to routers 145 or 125, respectively. Routers 145 or 125 in turn send corresponding requests, in the form of PIM-SM messages, to the next routers, 135 or 115, respectively, which in turn send corresponding PIM-SM messages towards router 105. These PIM-SM messages pass through the switch 120 located between the router 105 and the routers 115 and 135.

The multicast traffic sent by host 130 (channel (S1,G1)) and by host 140 (channel S2,G2)) passes through routers 145 and 135, and through routers 125 and 115, respectively, and reaches the switch 120 through its ports 123 and 122, respectively. A feature of the invention consists of routers 135 and 115 informing the switch 120 of how it should transmit the multicast traffic of channels (S1,G1) and (S2, G2), respectively. As a result, switch 120 knows for which equipment connected to each of its ports it should transmit the multicast traffic of each channel.

With respect to the multicast traffic sent by host 150 (channel (S3, G3)), the traffic directly reaches the switch 110 through its port 111.

One implementation consists of router 105, which receives the requests for multicast traffic that will be distributed by switch 110, informs the switch 110 as to how it should transmit the multicast traffic reaching it directly from the sources, in this case from host 150. As a result, switch 110 knows for which equipment connected to each of its ports it should transmit the multicast traffic of each channel.

For example, if the following situation should occur:
host 130 has not requested any multicast traffic;
host 140 has not requested any multicast traffic;
host 150 has requested the traffic of channel (S1, G1) only;
host 160 has requested the traffic of channels (S1, G1) and (S2, G2);
host 170 has requested the traffic of channel (S3, G3) only; and
host 180 has requested the traffic of channel (S1, G1) only;
then, due to the fact that routers 135 and 115 have informed the switch 120 as to how it should transmit the multicast traffic of each channel, switch 120 transmits the multicast traffic through each of its ports as follows:
through port 121, it transmits the traffic of channels (S1, G1) and (S2, G2), since the router 105 that sent PIM-SM messages requesting the traffic is connected to this port;
it does not transmit any multicast traffic through ports 122 and 123, since there is no equipment connected to these ports that has requested multicast traffic;
and due to the fact that router 105 has informed the switch 110 as to how it should transmit the multicast traffic of each channel, switch 110 transmits the multicast traffic through each of its ports as follows:
it transmits the traffic of channel (S1, G1) through port 111, since host 150 which sent IGMP messages requesting the traffic is connected to this port;
it transmits the traffic of channels (S1, G1) and (S2, G2) through port 112, since host 160 which sent IGMP messages requesting the traffic is connected to this port; and it transmits the traffic of channels (S1, G1) and (S3, G3) through port 113, since hosts 170 and 180 which sent IGMP messages requesting the traffic are connected to this port.

Given that a switch can be connected to several routers, as occurs for example with switch 120 of FIG. 1 which is connected to routers 105, 125 and 135, it is necessary to establish rules determining which routers inform the switch, by means of an MFP message, as to how the switch should transmit the multicast traffic. It is also necessary to define the information that each router transmits to the switch in the MFP messages.

A first solution is that all the routers connected to a switch send MFP messages to the switch relating to the traffic that each router receives or sends through the switch. The drawback of this solution is that it is possible for several routers to send redundant information to the switch.

A second solution consists of defining rules for determining which of the router sends the MFP messages to the switch in each case, such that redundant information is not sent to the switch. Exemplary Rules 1 and 2 are described below.

Rule 1: the router transmitting the multicast traffic of a channel (Si,Gi) to the switch is responsible for informing the switch as to how to transmit the traffic.

In the example of FIG. 1, the application of Rule 1 means that the routers responsible for informing switch 120 as to how it should transmit the traffic of each of the channels (S1,G1) and (S2,G2), are respectively routers 135 and 115. Router 105 is also responsible for informing the switch 110 as to how it should transmit channels (S1,G1), (S2,G2) and (S3, G3).

Rule 1 is especially advantageous when two routers communicate with one another by means of the PIM-SM protocol and there is a switch between them, as is the case of switch 120 of FIG. 1, because it allows applying a mechanism of the PIM-SM protocol referred to as Assert messages preventing two routers from transmitting the same multicast traffic to the same network.

Rule 2: if a router receives multicast traffic requests, either by means of IGMP messages or by means of PIM-SM messages, of a multicast channel sent by a source which is connected to the router by means of a switch, the router sends MFP messages to the switch so that it transmits the multicast channel to all the equipment requesting it, including the actual network interface of the router.

In the example of FIG. 1, the application of Rule 2 means that router 105 informs the switch 110 as to how it should transmit the traffic of channel (S3, G3) sent by host 150 acting as a source.

For example, if host 170 requests traffic of channel (S3, G3) by sending an IGMP message to router 105 through switch 110, by applying Rule 2 router 105 will send an MFP message to the switch to indicate that it should transmit the traffic of channel (S3, G3) to host 170. This MFP message contains an identifier of host 170, as previously explained.

For example, if host 140 requests traffic of channel (S3, G3) by sending an IGMP message to router 125, the latter sends a corresponding PIM-SM message to router 115, which in turn sends another corresponding PIM-SM message to router 105 through switch 120. When router 105 receives this PIM-SM message sent by router 115 to request traffic of channel (S3, G3), by applying Rule 2 router 105 sends an MFP message to switch 110 to indicate that it should transmit traffic of channel (S3, G3) to the actual router 105. This MFP message contains an identifier of router 105, as previously explained.

Router 115 knows that there is another router 105 between it and the source sending channel (S3, G3), which in this case is host 150, due to the fact that in multicast protocols, such as the PIM-SM protocol for example, the routers announce themselves to one another by sending periodic messages referred to as Hello messages.

Router 105 also knows that there is no other router between its network interface 106 and host 150 because it has not received Hello messages through the network interface 106, and because it has detected that switch 110 is connected to its network interface 106 as a result of some of the methods for detecting switches that will be explained below.

The IGMP protocol also has a mechanism for preventing two IGMP routers from sending the same multicast traffic to the same network, based on choosing a router referred to as a Designated Router or DR for transmitting specific multicast traffic. The mechanism of the DR router is known by the person skilled in the art and it is therefore considered unnecessary to explain in further detail. When Rule 2 is applied, advantage is taken from this mechanism of the DR router for choosing a router and preventing duplicate information from being sent to the switch: therefore, each router receiving requests for IGMP traffic through a switch sends MFP messages to the switch relating only to the multicast channels for which the router is the DR router.

Normally, a router does not always know that it is connected to a switch because switches do not modify the data frames they carry. As has been seen, to apply Rules 1 and 2 it is necessary for the routers to know that they are connected to a switch. Different solutions can be provided to that end.

A first solution consists of manually configuring the router, indicating the network interfaces of the router in which the MFP protocol must be executed for informing a switch connected to the network interface.

A second solution consists of the router detecting the BPDU (Bridge Protocol Data Units) messages sent by a switch in the Spanning Tree protocol belonging to the state of the art.

A third solution consists of making use of the Ethernet auto-negotiation process. The Ethernet auto-negotiation process detects when there is only one equipment connected to a port of a switch in order to use in Full-Duplex mode the network interface of the equipment connected to the port of the switch. If a network interface of a router operates in Full-Duplex mode and receives IP packets with different origin IP addresses, this means that either a switch or equipment having several IP addresses is connected to the network interface. However, if the router receives through the network interface IGMP messages with different origin IP addresses, then it means that the equipment connected to the network interface is a switch.

TABLE 1

Name and abbreviation assigned to each value of the "Record Type" field in the "Group Record "blocks contained in the MFP messages sent by a router.

| Value | Name | Abbreviation |
|---|---|---|
| 1 | MODE_IS_INCLUDE | IS_IN (B) |
| 2 | MODE_IS_EXCLUDE | IS_EX (B) |
| 8 | ALLOW_NEW_SOURCES_INCLUDE | ALLOWIN (B) |
| 9 | BLOCK_OLD_SOURCES_INCLUDE | BLOCKIN (B) |
| 10 | ALLOW_NEW_SOURCES_EXCLUDE | ALLOWEX (B) |
| 11 | BLOCK_OLD_SOURCES_EXCLUDE | BLOCKEX (B) |

TABLE 2

Operating example of an improved switch according to the invention receiving MFP messages sent by a router.

| | STATE 1 | MESSAJE | STATE 2 | ACTION |
|---|---|---|---|---|
| 1. | INCLUDE (A) EXCLUDE (Y) | IS_IN (B) | INCLUDE (B) EXCLUDE (Y) | T (B) = GMI DEL (A − B) |
| 2. | INCLUDE (A) EXCLUDE (Y) | IS_EX (B) | INCLUDE (A) EXCLUDE (B) | DEL (Y − B) GT = GMI |
| 3. | INCLUDE (A) EXCLUDE (Y) | ALLOWIN (B) | INCLUDE (A + B) EXCLUDE (Y) | T (B) = GMI |
| 4. | INCLUDE (A) EXCLUDE (Y) | BLOCKIN (B) | INCLUDE (A − B) EXCLUDE (Y) | DEL (B) |
| 5. | INCLUDE (A) EXCLUDE (Y) | ALLOWEX (B) | INCLUDE (A) EXCLUDE (Y − B) | DEL (B) |
| 6. | INCLUDE (A) EXCLUDE (Y) | BLOCKEX (B) | INCLUDE (A) EXCLUDE (Y + B) | |

What is claimed is:

1. A method for managing multicast traffic through a switch operating in the layer 2 of the OSI (Open Systems Interconnection) model, characterized in that a router that has received from specific equipment, which can be a host or another router, a request for a specific multicast traffic, sends to a switch, connected to the network interface of said router through which said router has received said request, a message containing an identification of said specific equipment and a specification of said specific multicast traffic; and in that when said switch receives through one of its ports data carrying multicast traffic, said switch, based on the destination and origin addresses of said data carrying multicast traffic, and based on said identification of the specific equipment and on said specification of the specific multicast traffic which said router has sent to said switch by means of said message, deduces if said data carries said specific traffic which has been requested by said specific equipment, and said switch decides through which of its ports it transmits said data;

wherein said specification of the specific multicast traffic comprises information as to the sources the traffic of which has been requested by said specific equipment;

wherein said router stores in specific records, for each of its network interfaces and for each equipment and multicast group, information as to the sources the traffic of which has been requested by said equipment; said switch stores in corresponding specific records, for each equipment and multicast group, the information as to the sources the traffic of which has been requested by said equipment; and said specific records of the switch are updated when such switch receives one of said messages sent by said router; and wherein said messages sent by said router to said switch separately contain, for each specific equipment: included sources list of a multicast group, indicating that said specific equipment wishes to receive the traffic sent by said included sources; excluded sources lists of a multicast group, indicating that said specific equipment wishes to receive the traffic sent by all the sources of said multicast group except said excluded sources; and said specific records stored in said router and in said switch separately contain, for each specific equipment and multicast group, the data of said included sources and the data of said excluded sources.

2. A method according to claim 1, characterized in that said message which said router sends to said switch is encapsulated in IP data packets.

3. A method according to claim 1, characterized in that said identification of the specific equipment contained in the message which said router sends to said switch comprises the IP address of said specific equipment.

4. method according to claim 3, characterized in that said switch receiving said message executes the ARP (Address Resolution Protocol) protocol for associating a MAC address to said IP address of the specific equipment.

5. A method according to claim 1, characterized in that said identification of the specific equipment contained in the message which said router sends to said switch comprises the MAC address of said specific equipment.

6. A method according to claim 1, characterized in that said identification of the specific equipment contained in the message which said router sends to said switch comprises the IP address and also the MAC address of said specific equipment.

7. A method according to claims 1, characterized in that said messages which said router sends to said switch are layer 3 messages in the OSI (Open Systems Interconnection) model and when said switch receives data through one of its ports said switch analyzes the destination address of said data in order to find out if said data carries one of said messages sent by said router and if it does said switch does not transmit said data but rather it processes it in order to read said message.

8. A method according to claim 1, characterized in that when a switch is connected to several routers, in order to prevent said routers from sending to said switch said messages with redundant information, each of said routers only sends said messages to the switch if it is in one of the two following cases: said router transmits the traffic of a multicast channel to the switch; said router receives requests for traffic of a multicast channel sent by a source which is connected to said router through said switch.

9. A router connectable to a switch operating in the layer 2 of the OSI (Open Systems Interconnection) model, characterized in that it stores executable instructions for, after receiving from a specific equipment, which can be a host or another router, a request for specific multicast traffic, sending to a switch, connected to the network interface of said router through which said router has received said request, a message containing an identification of said specific equipment and a specification of said specific multicast traffic, wherein said specification comprises information about the sources the traffic of which has been requested by said equipment, wherein said router stores executable instructions for storing in specific records, for each of its network interfaces and for each equipment and multicast group, information about the sources the traffic of which has been requested by said equipment; and wherein said router further stores executable instructions for including in said messages it sends to the switch, separately and for each specific equipment: included sources list of a multicast group, indicating that said specific equipment wishes to receive the traffic sent by said included sources; excluded sources list of a multicast group, indicating that said specific equipment wishes to receive the traffic sent by all the sources of said multicast group except said excluded sources; and so that said specific records stored in said router separately contain, for each specific equipment and multicast group, the data of said included sources and the data of said excluded sources.

10. A router according to claim 9, characterized in that it stores executable instructions for finding out if it is connected to a switch to which other routers are also connected, and if it does only sending said messages to said switch if it is in one of the two following cases: said router transmits to the switch the traffic of a multicast channel; said router receives requests for traffic of a multicast channel sent by a source which is connected to said router through said switch.

11. A switch operating in the layer 2 of the OSI (Open Systems Interconnection) model, characterized in that it stores executable instructions for, when data carrying multicast traffic is received through one of its ports, based on the destination and origin addresses of said data carrying multicast traffic, and based on said identification of the specific equipment and on said specification of the specific multicast traffic which a router has sent to said switch by means of said message, deducing if said data carry said specific traffic which has been requested by said specific equipment, and said switch decides through which of its ports it transmits said data,
wherein said switch stores executable instructions for storing in specific records, for each equipment and multicast group, information about the sources the traffic of which has been requested by said equipment, and updating said records when said switch receives one of said messages sent by said router; and
wherein said switch characterized in that it stores executable instructions for storing said specific records such that such records separately contain, for each specific equipment and multicast group, included sources lists of a multicast group, indicating that said specific equipment wishes to receive the traffic sent by said included sources, and excluded sources lists of a multicast group, indicating that said specific equipment wishes to receive the traffic sent by all the sources of said multicast group except said excluded sources.

12. A switch according to claim 11, characterized in that it stores executable instructions for receiving said messages sent by said router, said messages being layer 3 messages in the OSI (Open Systems Interconnection) model, and for, when said switch receives data through one of its ports, analyzing the destination address of said data for finding out if said data carries one of said messages sent by said router and if it does, not transmitting said data and processing it to read said message.

13. A method for managing multicast traffic through a switch operating in the layer 2 of the OSI (Open Systems Interconnection) model, the method comprising:
receiving by the switch a message from a router, said message comprising an identification of a specific equipment which has sent to the router a request for a multicast traffic from a multicast group, said request received via a network interface connecting the router to the switch, wherein the message further comprises an INCLUDE source list of said multicast group, said INCLUDE source list associated with said specific equipment and indicating that said specific equipment wishes to receive from said multicast group a multicast traffic sent by the sources comprised in the INCLUDE source list; and an EXCLUDE source list of the multicast group, said EXCLUDE source list associated with said specific equipment and indicating that said specific equipment wishes to receive from said multicast group a multicast traffic sent by any of the sources of said multicast group except the sources comprised in the EXCLUDE source list;
storing, separately, by the switch and by the router respective records associated with said specific equipment and indicative of said request, said INCLUDE list associated with said specific equipment and said EXCLUDE list associated with said specific equipment; and
upon receiving by the switch a multicast traffic, transmitting by the switch the received multicast traffic related to the multicast traffic requested by said specific equipment in accordance with said record stored in the switch and associated with the specific equipment.

14. A router connectable via a network interface to a switch operating in the layer 2 of the OSI (Open Systems Interconnection) model, the router configured for:
after receiving via the network interface from a specific equipment, which can be a host or another router, a request for a multicast traffic from a multicast group, to send to the switch a message comprising an identification of said specific equipment, wherein the message further comprises an INCLUDE source list of said multicast group, said INCLUDE source list associated with said specific equipment and indicating that said specific equipment wishes to receive from said multicast group a multicast traffic sent by the sources comprised in the INCLUDE source list; and EXCLUDE source list of said multicast group, said EXCLUDE source list associated with said specific equipment and indicating that said specific equipment wishes to receive from said multicast group a multicast traffic sent by any of the sources of said multicast group except the sources comprised in said EXCLUDE source list;
to store a record associated with said specific equipment and indicative of said request, said INCLUDE list associated with said specific equipment and said EXCLUDE list associated with said specific equipment.

15. A switch operating in the layer 2 of the OSI (Open Systems Interconnection) model, the switch configured for:
to receive a message from a router, said message comprising an identification of a specific equipment which has sent to the router a requests for a multicast traffic from a multicast group, said request received via a network interface connecting the router to the switch, wherein the message further comprises an INCLUDE source list of said multicast group, said INCLUDE source list associated with said specific equipment and indicating that said specific equipment wishes to receive from said multicast group a multicast traffic sent by sources comprised in the INCLUDE source list; and an EXCLUDE source list of said multicast group, said EXCLUDE source list associated with said specific equipment and indicating that said specific equipment wishes to receive from said multicast group a multicast traffic sent by any of the sources of said multicast group except the sources comprised in the EXCLUDE source list;
to store a record associated with said specific equipment and indicative of said request, said one or more included lists associated with said specific equipment and said one or more excluded lists associated with said specific equipment; and
upon receiving a multicast traffic, to transmit the received multicast traffic related to the multicast traffic requested by said specific equipment in accordance with said stored record associated with said specific equipment.

* * * * *